US009996387B2

(12) United States Patent
Follett et al.

(10) Patent No.: US 9,996,387 B2
(45) Date of Patent: Jun. 12, 2018

(54) CONTEXT SWITCHING FOR COMPUTING ARCHITECTURE OPERATING ON SEQUENTIAL DATA

(71) Applicant: Lewis Rhodes Labs, Inc., Concord, MA (US)

(72) Inventors: David Follett, Boxborough, MA (US); Pamela L. Follett, Boxborough, MA (US)

(73) Assignee: Lewis Rhodes Labs, Inc., Concord, MA (US)

( * ) Notice: Subject to any disclaimer, the term of this patent is extended or adjusted under 35 U.S.C. 154(b) by 0 days. days.

(21) Appl. No.: 15/425,971

(22) Filed: Feb. 6, 2017

(65) Prior Publication Data

US 2017/0147391 A1 May 25, 2017

Related U.S. Application Data

(63) Continuation-in-part of application No. 14/071,465, filed on Nov. 4, 2013, now Pat. No. 9,563,599.

(51) Int. Cl.
*G06F 15/76* (2006.01)
*G06F 9/00* (2006.01)
(Continued)

(52) U.S. Cl.
CPC ............ *G06F 9/461* (2013.01); *G06F 3/0611* (2013.01); *G06F 3/0634* (2013.01);
(Continued)

(58) Field of Classification Search
USPC .................. 712/30, 225–226; 709/223–224; 711/119, 122, 140
See application file for complete search history.

(56) References Cited

U.S. PATENT DOCUMENTS 4,760,523 A 7/1988 Yu et al.
7,643,353 B1 1/2010 Srinivasan et al.
(Continued)

FOREIGN PATENT DOCUMENTS

EP 0233401 A2 8/1987

OTHER PUBLICATIONS

Baker et al., "A Methodology for Synthesis of Efficient Intrusion Detection Systems of FPGAs," Proc. of 12th IEEE Symposium on Field Programmable Custom Computing Machines (FCCM), pp. 1-10, (Apr. 2004).

(Continued)

*Primary Examiner* — Raymond Phan
(74) *Attorney, Agent, or Firm* — Sunstein Kann Murphy & Timbers LLP

(57) ABSTRACT

A data stream processing unit (DPU) and methods for its use and programming are disclosed. A DPU includes a number of processing elements (PEs) arranged in a physical sequence. Each datum in the data stream visits each PE in sequence. Each PE has a memory circuit, data and metadata input and output channels, and a computing circuit. The metadata input represents a partial computational state that is associated with each datum as it passes through the DPU. Each computing circuit implements a finite state machine that operates on the data and metadata inputs as a function of its position in the sequence and a data context, producing an altered partial computational state that accompanies the datum. When the data context changes, the current state of the finite state machine is stored, and a new state is loaded. The processing elements may be collectively programmed to perform any desired computation.

21 Claims, 21 Drawing Sheets

(51) Int. Cl.
*G06F 9/46* (2006.01)
*G06F 13/16* (2006.01)
*G06F 3/06* (2006.01)
*G06F 15/80* (2006.01)
*G06F 15/82* (2006.01)
*G06F 9/38* (2018.01)

(52) U.S. Cl.
CPC .......... *G06F 3/0685* (2013.01); *G06F 9/3885* (2013.01); *G06F 13/1663* (2013.01); *G06F 15/8046* (2013.01); *G06F 15/82* (2013.01)

(56) References Cited

U.S. PATENT DOCUMENTS

| | | | | |
|---|---|---|---|---|
| 8,045,582 | B1* | 10/2011 | Petrus | H04N 21/2381 370/468 |
| 8,526,458 | B1* | 9/2013 | Jensen | H04L 27/2631 370/432 |
| 9,083,740 | B1 | 7/2015 | Ma et al. | |
| 9,563,599 | B2 | 2/2017 | Follett et al. | |
| 2007/0075878 | A1 | 4/2007 | Furodet et al. | |
| 2008/0208372 | A1 | 8/2008 | Pannese | |
| 2008/0262990 | A1* | 10/2008 | Kapoor | G06F 9/505 706/20 |
| 2011/0219208 | A1* | 9/2011 | Asaad | G06F 15/76 712/12 |
| 2011/0231564 | A1* | 9/2011 | Korsunsky | G06F 21/55 709/231 |
| 2013/0246771 | A1* | 9/2013 | Farrell | G06F 9/3005 712/227 |
| 2013/0247010 | A1* | 9/2013 | Bradbury | G06F 9/3005 717/130 |

OTHER PUBLICATIONS

Cherniack et al., "Scalable Distributed Stream Processing," Proceedings of the 2003 CIDR Conference, 12 pages, (2003).

Dlugosch et al., "An Efficient and Scalable Semiconductor Architecture for Parallel Automata Processing," IEEE Transactions on Parallel and Distributed Systems, pp. 1-11, (2013).

Dlugosch et al., "Supplementary Material for An Efficient and Scalable Semiconductor Architecture for Parallel Automata Processing," IEEE Transactions on Parallel and Distributed Systems, pp. 1-5, (2013).

Follett, "Theory and Application of Data Stream Processing Units (DPUs)," Blue I Systems, CLSAC, 51 pages, (Oct. 16-18, 2012).

Follett, "Theory and Application of Data Stream Processing Units (DPUs)," Blue I Systems, Salishan, 45 pages, (Apr. 22-25, 2013).

Follett, "Neuromorphic Data Microscope CLSAC'16," Lewis Rhodes Labs, Sandia National Laboratories, 26 pages, (Oct. 28, 2016).

Jiang et al., "Scalable Multi-Pipeline Architecture for High Performance Multi-Pattern String Matching," 12 pages, IEEE International Parallel and Distributed Processing Symposium, (Jun. 16, 2009).

Kapasi et al., "Programmable Stream Processors," IEEE Computer Society, pp. 54-62, (Aug. 2003).

Lin et al., "Using String Matching for Deep Packet Inspection," IEEE Computer Society, pp. 23-28, (Apr. 2008).

Michailidis et al., "A Programmable Array Processor Architecture for Flexible Approximate String Matching Algorithms," IEEE Computer Society, Proceedings of the 2005 International Conference on Parallel Processing Workshops (ICPPW'05), 9 pages, (2005).

Sourdis et al., " Fast, Large-Scale String Match for a 10Gbps FPGA-based Network Intrusion Detection System," Lecture Notes in Computer Science, 2778:880-889, 10 pages, (2003).

Yang et al., "Memory-Efficient Pipelined Architecture for Large-Scale String Matching," $17^{th}$ IEEE, 8 pages, (2009).

International Searching Authority, International Search Report— International Application No. PCT/US2014/063385, dated Feb. 6, 2015, together with the Written Opinion of the International Searching Authority, 10 pages.

* cited by examiner

Relative Performance

|  | 32 Blade HP Rack 128*AMD 6380 | DPU | |
|---|---|---|---|
|  |  | FPGA | ASIC |
| Throughput/ Processor | 1 | 1,250 | 100,000 |
| Cost | 1 | 940 | 750,000 |
| Power | 1 | 3,100 | 250,000 |
| Volume | 1 | 57,000 | 4,500,000 |
| Weight | 1 | 100,000 | 8,600,000 |

FIG. 8

CONTEXT SWITCHING FOR COMPUTING ARCHITECTURE OPERATING ON SEQUENTIAL DATA

CROSS-REFERENCE TO RELATED APPLICATIONS

This application is a continuation-in-part of U.S. application Ser. No. 14/071,465, filed Nov. 4, 2013 and entitled "Computing Architecture For Operating on Sequential Data," the contents of which is incorporated herein by reference in its entirety.

TECHNICAL FIELD

The present invention relates to a memory-temporal computing architecture, and more particularly to a computing architecture for performing general-purpose computations in which computations are made by passing input data and a hierarchy of related metadata together through a fixed sequence of memory locations in which the data and metadata are cooperatively operated upon.

BACKGROUND ART

Modern digital computer architectures typically provide a central processing unit ("CPU"), memory, and input/output ("I/O") ports. The CPU is the "thinking" center of calculation, operating on data stored in the memory according to a series of instructions generally called an "executable program". The memory stores the data upon which the CPU operates. The input ports transmit data into the memory from the external environment, and the output ports receive from the memory data that have been operated on according to the executable program for transmission to the external environment. Some non-volatile external memory, such as a hard disk drive or compact disc, communicates with internal memory, such as random access memory ("RAM") and CPU-internal registers, using the I/O ports—the term "memory" as it is used herein means both external and internal memory.

Modern computer architectures may be broadly grouped into three categories: the Princeton (or Von Neumann) architectures, the Harvard architectures, and the modified Harvard architectures. In Princeton architectures as depicted schematically in FIG. 1, data and executable instructions are communicated to and from a CPU 11 using a data bus 12 from a volatile memory 13, or in some cases, a non-volatile memory such as a read-only memory, or "ROM" (not shown). In this way, when an executable program is executed by a user, the instructions are transmitted from the RAM 13 to the CPU 11 using the bus 12. When the instructions operate on data in the RAM 13, the computer uses the same bus 12 to fetch the data from the RAM 13 into the CPU 11 to perform the operation. Then, the computer uses the same bus 12 to save the new data back into the RAM 13 as necessary. Typically, these data and instructions are loaded into the volatile memory 13 from a non-volatile memory 15 using a data bus 14 before the program is executed.

By contrast, in the Harvard architecture 20 depicted schematically in FIG. 2, the instructions and the data have separate physical memories and separate physical buses. That is, there is an instruction memory 23 that stores instructions and an instruction bus 22 that carries instructions to the CPU 21, and there is a separate data memory 27 that stores data and a data bus 26 that carries data to the CPU 21. The volatile instruction memory 23 is connected to a non-volatile instruction memory 25 using a bus 24, and the volatile data memory 27 is connected to a non-volatile data memory 29 using a bus 28.

This Harvard architecture of FIG. 2 has certain advantages over the Princeton architecture of FIG. 1; for example, it is impossible to execute data as instructions, so this security vulnerability of the Princeton architecture is entirely eliminated. The types and widths of bits stored in the two types of memory may be different; thus, the instruction memory may store instructions having a variable bit width, while the data memory and data bus may be optimized to transfer data in large blocks. Moreover, having separate buses for instructions and data means that both instructions and data can be read from their respective memories at the same time, increasing processing speed and reducing circuit complexity, albeit at the expense of increased circuit size. However, the Harvard architecture suffers from additional logistical complexities because instructions and data are separately stored, and therefore must be separately managed.

Therefore, many modern computers implement a modified Harvard architecture as depicted schematically in FIG. 3. In this architecture, the CPU 31 has two separate physical buses: an instruction bus 32 connecting it to an instruction cache 33 and a data bus 34 connecting it to the main memory 35 to store and retrieve data. However, executable programs may include both instructions and data, and are loaded for execution from a common non-volatile memory 37 using a single, optimized data bus 36. Instructions are loaded into the instruction cache 33 as the program execution requires. Many programs spend much of their operating time executing the same instructions over and over, so the use of a specialized cache increases program execution speed. Thus, while the CPU 31 is executing instructions from the cache 33, it has the Harvard behavior, but while it is loading instructions into the cache 33 from the common memory 35, 37, it has the Princeton behavior. Typically the instruction cache 33 is large enough to include most or all of a program's most often-used instructions, so the CPU 31 spends most of its time operating according to the Harvard behavior.

All three categories of computer architectures share the common characteristic that the data memory is generally "flat"; that is, with some vendor-specific exceptions, there is no advantage to storing data in any one memory address over another. Because the memory space is flat, a computer operating system may store the instructions and data at any physical addresses in any memory location that happens to be unoccupied; the executable programs are therefore "relocatable" in memory. This is a useful property because it permits creation of executable files having instructions that use a "virtual" memory space; virtual memory addresses in the program are provided with a map into the physical memory circuits as a function of where and when the program is loaded into physical memory by the operating system. This facility permits a great deal of flexibility in the design of the operating system and applications. Modern computers may devote substantial hardware resources to implement the virtual-to-physical mapping that is required to execute programs, in the form of so-called page tables. However, the simplicity of the memory arrangement requires that the CPU be a complex device with similarly complex operating system software.

A programming language for computer systems that have a flat memory space must provide location-independent instructions. These instructions are parameterized to operate on data stored in any (virtual) memory location, because similar data may be stored in any such location. To perform a computation, these instructions are applied one after the other as "sequential logic," perhaps taking different memory addresses as arguments, according to the design of a computer programmer to achieve an intended result.

The above-described computer architectures are not optimized to process generalized streams of data. In particular, to process a data stream in accordance with an existing computer architecture, streamed data typically are stored temporarily in a buffer that includes one or more memory locations, and sequential logic is applied to the buffer. Once processing of the data is complete, new data are stored in the buffer, and the entire sequential logic is repeated on the new data. While hardware and software systems have been provided to process streamed data in particular contexts, such as routing of high-bandwidth network data, such systems are necessarily application-specific, and are heavily optimized as a function of properties of the application space, such as a format of the input data. There does not exist a general-purpose programmable system for processing arbitrary data streams with high efficiency.

SUMMARY OF ILLUSTRATED EMBODIMENTS

Various embodiments of the present invention solve the above problems by providing a computer architecture in which the memory space is sequential, rather than flat. In these embodiments, a sequence of one or more instructions is defined for each memory location in a program, and program execution comprises passing data from one physical memory location to the next, sequentially, to be operated upon by the instructions at that location. The instructions at any given location may include branched logic, and the collection of logic (whether branched or not) in all memory locations comprises an entire algorithm for operating on a data stream. In this way, each datum in a data stream experiences the same algorithm.

Sequential memory locations are connected by both a data bus and a signal bus. The data bus carries the data from each memory location to the next, while the signal bus carries intermediate results of, or metadata pertaining to, the computation in progress. In this way, data are operated on in a serial, temporal fashion.

Because there is no central processing unit, there is no fan-out of buses to carry the results of the computation to the CPU from the memory and back again; each memory location may be a small, fixed physical distance from each subsequent memory location, and the metadata describing the intermediate computational state accompany the data as they travel through the memory. In this way, arbitrary computations may be performed on streams of data at incredibly high speeds. Processing may be provided in-line, so that the computations introduce only a fixed latency into the data stream, but do not affect its bandwidth. Data from experimental simulations of this architecture show that it provides several orders of magnitude improvement over the prior art, with the size of the improvement depending on the specific problem to be solved and which metric is observed. Moreover, a design is disclosed by which individual instructions can be associated with each memory location in a modular fashion, permitting large-scale production of the architecture using manufacturing techniques already known in the art. Because data from different context, sources, or users are often multiplexed into a single data stream, various embodiments of the invention provide a mechanism for reprogramming each memory location "on the fly" as in-band session changes are recognized. Thus, the sequence of memory locations may operate on several data "contexts" simultaneously, and each individual memory location may operate on a particular one of those contexts.

Embodiments of the invention may perform both temporal, or spatial-temporal computations. The above-described embodiments provide temporal processing; that is, they process a single stream of data where each datum arrives at each memory location in a temporal sequence. Such embodiments are useful in linear applications such as cryptography or cyber security that provide single data streams. However, in other embodiments, such as video or audio processing or stock market analysis, data streams include spatial data in addition to temporal data. For example, in a video processing application, each pixel of a camera receives color data as a function of time, and the pixels are related to each other in a known spatial arrangement. Some useful functions, such as detection of shapes and edges, require computation based on the relative locations of the pixels in addition to information relating to the change in the color data over time. Various spatial-temporal embodiments of the present invention provide "planes" or "layers" of spatial computational processing that are themselves temporally arranged. This arrangement is similar to the organization of processing layers found in the visual cortex of the human brain.

Therefore, in a first embodiment of the invention there is provided a data stream processing unit (DPU) for performing a computation upon a stream of data that is organized according to a plurality of contexts. The DPU includes a plurality of processing elements arranged in a physical sequence, the plurality of processing elements cooperating to perform the computation.

Each given processing element has a first memory circuit. Each processing element also has a data input channel, coupled to the first memory circuit, configured to receive into the first memory circuit an input datum in the stream of data from a processing element preceding the given processing element in the sequence, the input datum being associated with a context in the plurality of contexts. Each processing element also has a metadata input channel, coupled to the first memory circuit, configured to receive into the first memory circuit an input metadata signal from the preceding processing element, the input metadata signal representing a first state of the computation. Next, each processing element has a programmable computing circuit configured as a programmable finite state machine having a plurality of states that operates, as a function of a position of the given processing element in the sequence and the context, on the input datum and the input metadata signal to produce an output datum and an output metadata signal, the output metadata signal representing a second state of the computation that is different from the first state. Each processing element also has a data output channel, coupled to the first memory circuit, configured to transmit the output datum to a processing element succeeding the given processing element in the sequence. Each processing element has a metadata output channel, coupled to the first memory circuit, configured to transmit the output metadata signal to the succeeding processing element. Finally, each processing element has a second memory circuit, coupled to the computing circuit.

The computing circuit is further configured to switch between contexts when a first input datum is associated with a first context but a next input datum is associated with a different, second context. To do so, the computing circuit first stores, in the second memory circuit, an active state of the programmable finite state machine in association with data identifying the first context. Then, the computing circuit retrieves, from the second memory circuit, a new state of the programmable finite state machine according to data identifying the second context.

Variations are contemplated. The finite state machine of at least one processing element may be configured to be reprogrammed during the course of the computation. The finite state machine of at least one processing element may be configured to produce an output datum that is different than the input datum, thereby modifying the stream of data received by a succeeding processing element in the sequence. The computing circuit of at least one processing element in the sequence may be configured to introduce a latency into producing the output metadata signal. A given processing element in the sequence may have either or both of: (a) a plurality of data and metadata input channels that are configured to receive into the first memory circuit a plurality of input data and input metadata signals from a respective plurality of preceding processing elements, and (b) a plurality of data and metadata output channels that are configured to transmit the output datum and output metadata signal to a respective plurality of succeeding processing elements.

Each context may be associated with a session comprising a plurality of data communications. If the stream of data includes, for each such communication, a session identifier and the communicated data, the computing circuit may be further configured, for each such communication, to store the active state and to retrieve the new state after receiving the session identifier and before receiving the communicated data. If the stream of data includes, between the session identifier and the communicated data for each communication, a datum for annotating a prior communication, then the computing circuit may be further configured so that, when the input datum is the annotating datum, the finite state machine operates to produce an output annotating datum that annotates the prior communication.

The computation may include locating one or more patterns of bits in the stream of data. The circuitry of each processing element in the plurality of processing elements may be identical to the circuitry of each other processing element in the plurality of processing elements. The data input channel of each processing element may be coupled to the data output channel of a preceding processing element, and the metadata input channel of each processing element may be coupled to the metadata output channel of the preceding processing element.

The programmable computing circuit may include a state machine that has a transition function determined by the position in the sequence of the given computing circuit, wherein the given computing circuit operates on the input datum and the input metadata signal to produce the output datum and output metadata signal by applying the transition function. The transition function may operate as a function of a sequence of received input data or input metadata signals.

The memory circuit may have a data register and a metadata register. The data input channel and the metadata input channel may together comprise one data bus, or the data output channel and the metadata output channel may together comprise one data bus. The programmable computing circuit may include a field programmable gate array (FPGA) or an application-specific integrated circuit (ASIC). Moreover the DPU may be manufactured as an integrated circuit die on a semiconductor wafer. Each processing element may receive its respective input datum and input metadata signal according to a regular, simultaneous clock signal that controls the flow of data.

The processing elements of a DPU may have fan-in of either the metadata or data signals. That is, in a fan-in embodiment, a given processing element in the sequence may have a plurality of metadata (or data) input channels that are configured to receive into the memory circuit a respective plurality of input metadata signals (respectively data), and the computing circuit of the given processing element is further configured to operate on the input datum and the plurality of input metadata signals (or the plurality of input data and the single input metadata) to produce the output datum and the output metadata signal. The processing elements of a DPU likewise may have fan-out of either the metadata or data signals. That is, in a fan-out embodiment, a given processing element in the sequence may have a plurality of metadata (or data) output channels that are configured to transmit the output metadata (respectively data) signal to a plurality of succeeding processing elements.

There is also contemplated an expansion card (e.g. a PCI card) for a computer system having a plurality of such data stream processing units, where each data stream processing unit of the plurality is coupled to an input data stream, and each data stream processing unit of the plurality performs a different computation. In this way, multiple DPUs may be configured to execute multiple computations in parallel.

In another embodiment of the invention, there is provided a method of performing a computation upon a stream of data that is organized according to a plurality of contexts. The method first includes receiving an input datum, into a first memory circuit of a given processing element selected from a plurality of processing elements arranged in a physical sequence, from a processing element preceding the given processing element in the sequence, the input datum being associated with a context in the plurality of contexts. The method next includes receiving an input metadata signal, into the first memory circuit, from the preceding processing element, the input metadata signal representing a first state of the computation. The method further includes operating, by a programmable finite state machine having a plurality of states, as a function of a position of the given processing element in the sequence and the context, on the input datum and the input metadata signal to produce an output datum and an output metadata signal, the output metadata signal representing a second state of the computation that is different from the first state. The method further includes, when a first input datum is associated with a first context but a next input datum is associated with a different, second context, (a) storing, in a second memory circuit, an active state of the programmable finite state machine in association with data identifying the first context, and (b) retrieving, from the second memory circuit, a new state of the programmable finite state machine according to data identifying the second context. The method finally includes transmitting the output datum and the output metadata signal to a processing element succeeding the given processing element in the sequence. The method may be varied in like manner to the data stream processing unit described above.

In accordance with yet another embodiment of the invention, there is provided a non-transitory, tangible computer readable storage medium on which is stored computer program code for performing a computation upon a stream of data that is organized according to a plurality of contexts. The program code includes a plurality of transition tables for a respective plurality of finite state machines that are arranged in a physical sequence. Each transition table is formed as a function of a position of its respective finite state machine in the sequence. The computation itself is collectively performed by causing each finite state machine to apply its transition table in sequence, according to an active state, to each given datum in the stream of data and an associated metadata signal, producing a new state associated with the given datum. A final finite state machine in the sequence indicates whether the computation is successful. Each given datum is associated with a context in the plurality of contexts. When a first input datum is associated with a first context but a next input datum is associated with a different, second context, the active state is stored into a memory in association with data identifying the first context and a new state of the programmable finite state machine is retrieved from the memory according to data identifying the second context. The program code stored on the storage medium may be varied in like manner to the data stream processing unit and method described above.

The storage medium also may be varied in additional ways. For example, each context may be associated with a session comprising a plurality of data communications, and the stream of data may include, for each such communication, the communicated data and a datum for annotating the communication. In such embodiments, at least one transition table stored on the storage medium may define an annotating state wherein a finite state machine, applying the at least one transition table to the annotating datum according to the first context, annotates the communication by modifying the annotating datum in-place. Also, if the communicated data comprise the first input datum, and the second input datum is between the first input datum and the annotating datum in the stream of data, the at least one transition table may define a transition function for the second input datum so that the finite state machine, when applying the at least one transition table to the second input datum, enters the annotating state.

The systems, methods, and computer program code described herein may be used for performing a computation that pertains to at least one of: data networking, data security, computer security, fraud detection, data loss protection, data zoning in a storage arrangement, financial transactions, big data analytics, video analysis, image analysis, data network routing, speech recognition, neuronal fabric simulations, streaming data analysis, inference, machine learning, machine attention, analysis of mixed telemetry, machine decision making, extraction of temporal structure from data, extraction of spatial structure from data, representation of temporal structure in data, and representation of spatial structure in data.

BRIEF DESCRIPTION OF THE DRAWINGS

The foregoing features of embodiments will be more readily understood by reference to the following detailed description, taken with reference to the accompanying drawings, in which:

FIG. 8 shows a normalized performance comparison of a DPU according to the embodiment of FIG. 7 with a rack of blade servers;

DETAILED DESCRIPTION OF SPECIFIC EMBODIMENTS

Various embodiments of the invention generally reverse the traditional model of streaming data computation, in the following sense. As explained above, traditional computer architectures use a complex processor core and simple memory. In accordance with embodiments of the invention disclosed herein, this model is reversed, so that the memory becomes complex, but each memory location is operated on by a simple processing element. In particular, various steps in the algorithm are fixed in a sequence of physical locations, and the data themselves stream past these locations in order.

Applications for which such sequential treatment is advantageous include, among others: image and video processing, encryption or decryption of a data stream (e.g. use of stream ciphers), speech recognition, big data and graph analysis, fraud and threat detection such as virus detection and cyber security applications, behavioral analysis, acoustic processing, and pattern matching generally. Some of these applications are described in more detail below.

In accordance with illustrated embodiments of the invention, an overall computation is performed on a stream of packetized data by a data stream processing unit, or "DPU". The data stream is divided into packets of a certain size or a variable size, depending on the needs of the application. A typical data stream has fixed size packets and may be viewed as a sequence of bit packets, a sequence of byte packets, a sequence of word packets, or a sequence of any other packet width. The computation is divided into a sequence of partial computations or steps that may be implemented using simple, modular hardware that may be programmable. Each such step is performed by a single processing element, or "PE". When the step is performed, it alters the state of the computation; the partial computational state may be stored in a streaming metadata signal that accompanies the data stream as it travels through the DPU. When all processing elements have been visited, the final output of the computation may be obtained from the streaming metadata signal or from auxiliary circuitry. In some embodiments, the computation is broken into several sub-computations; in this case, the final output of each sub-computation may be obtained separately, for example using separate auxiliary circuitry for each sub-computation.

Figure 1:
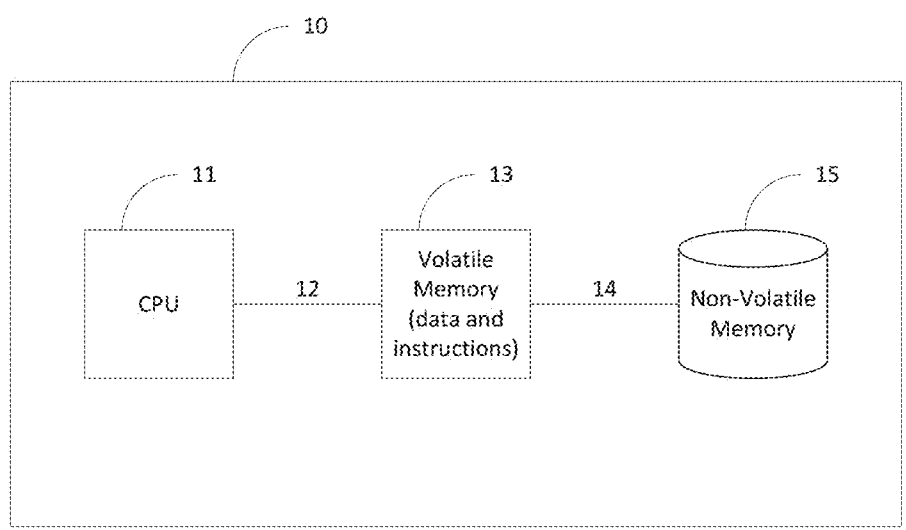
FIG. 1 schematically shows a Princeton (or Von Neumann) computer architecture, as known in the art.
Figure 2:
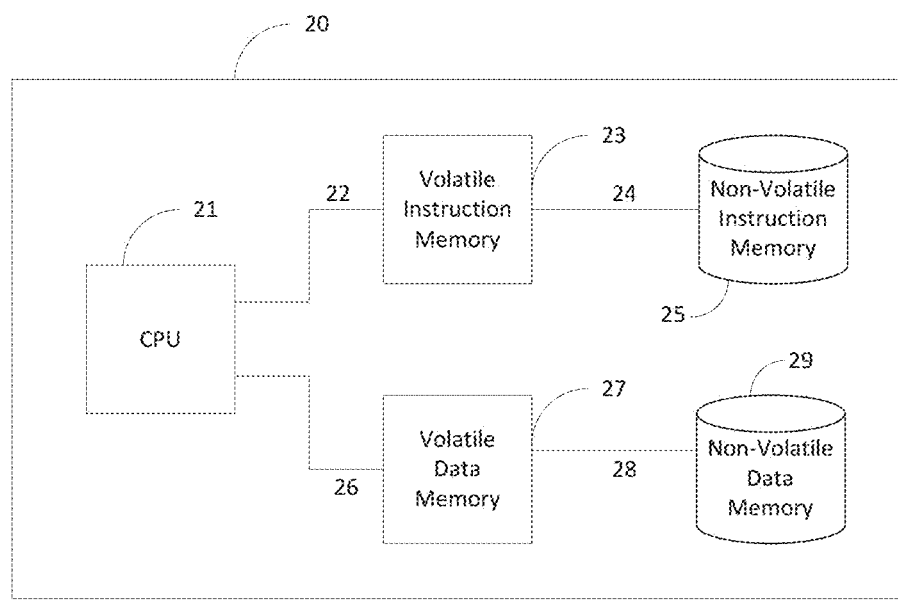
FIG. 2 schematically shows a (pure) Harvard computer architecture, as known in the art.
Figure 3:
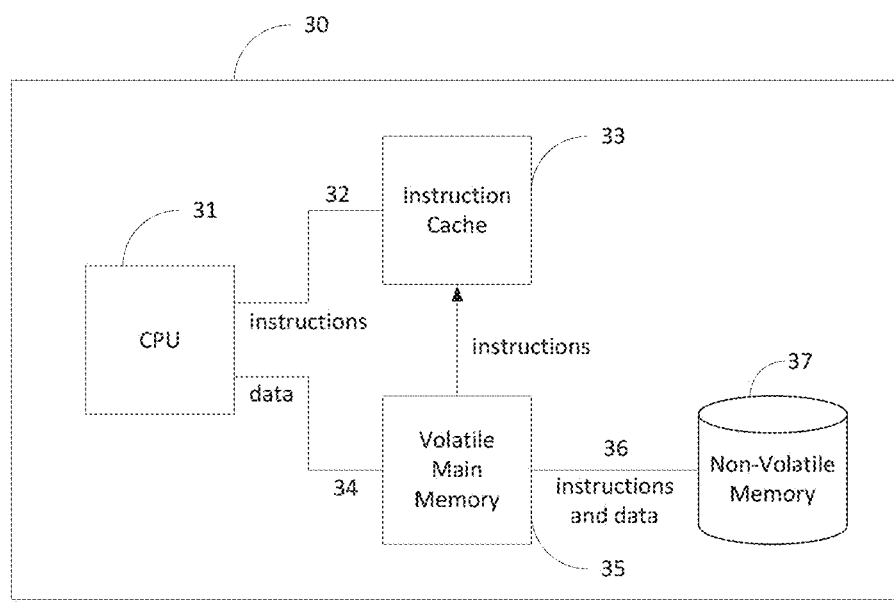
FIG. 3 schematically shows a modified Harvard computer architecture, as known in the art.
Figure 4:
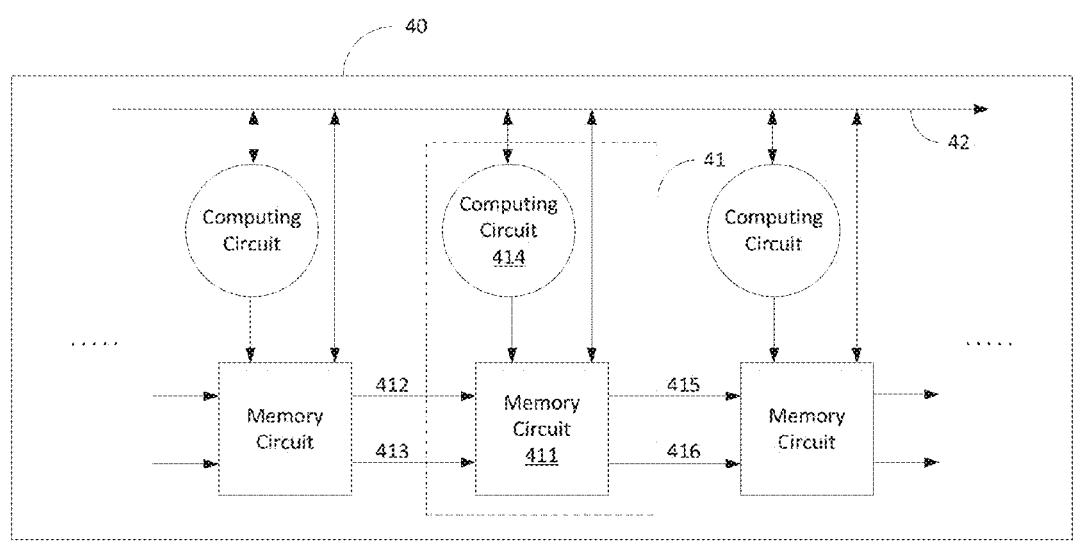
FIG. 4 schematically shows a sequential memory computing architecture for processing streaming data in accordance with an embodiment of the invention.

FIG. 4 schematically shows a portion of a sequential (temporal) memory computing architecture for processing streaming data in accordance with an embodiment of the invention. The new architecture is represented by a data stream processing unit 40. The DPU 40 includes a number of processing elements 41 in a fixed sequence. Packets of data flow into the DPU 40 from the left, visit each PE 41 in the sequence, and exit the DPU 40 on the right. A control bus 42 permits control signals, such as a clock signal, program code, or a MATCH signal (described in connection with FIG. 5) to be transmitted to and from the PE 41.

The operation of each processing element 41 is now described. PE 41 includes a memory circuit 411. This memory circuit 411 may include a data register for holding one packet of streaming data, and a metadata register for holding one unit of partial computational state.

The PE 41 also includes a data input channel 412 for receiving a packet-sized input data signal into the memory circuit 411 from the preceding processing element. The data input channel 412 may be implemented as a data bus. The width of the data input channel 412 constrains the width of the largest packet of data that may be streamed through the DPU 40; this maximum width must be considered when manufacturing the DPU 40. However, applications that require large data packets may avoid this constraint by multiplexing large data inputs into several packets, at the expense of more complex processing in a potentially larger number of processing elements.

The PE 41 also includes a metadata input channel 413 for receiving an input metadata signal into the memory circuit 411 from the preceding PE. The metadata input channel 413 may be implemented as a separate data bus, or as a combined data bus that includes the data input channel 412. The metadata input channel 413 may have a bus width different from the bus width of data input channel 412 because it carries a signal representing an intermediate computational state, including metadata pertaining to partial computations, and the number of bits of metadata signal required to be propagated from one PE to the next is a function of the algorithm, rather than the input data themselves. Thus, the width of the metadata input channel 413 constrains the complexity of the algorithms that may be implemented on the DPU 40. Again, applications that require complex metadata may avoid this constraint by multiplexing this metadata into several packets. If necessary, latency can be introduced to ensure that this metadata always travels with the data to which it pertains.

The PE 41 also includes a programmable computing circuit 414. As described above, the overall algorithm is broken into a number of steps; each computing circuit 414 is programmed to perform one of these steps. The computing circuit 414 takes as input the data stored in the data register of the memory circuit 411 and the metadata stored in the metadata register. It then operates on this input to produce an output data signal and an output metadata signal, which are provided to a data output channel 415 and a metadata output channel 416 respectively for transmission to the next PE in the sequence.

Typically, the output data signal is the same as the input data signal for each PE in the sequence, so that the data pass without modification through each PE 41 and through the DPU 40. An example of this functionality is discussed below in connection with FIGS. 5 and 6A-6C. However, in some applications where the stream of data may be consumed by the DPU 40 without a need for further downstream processing, the PE 41 may alter the data stream as it passes through so the output data signal differs from the input data signal. An example of this functionality is discussed below in connection with FIG. 7.

The computing circuit 414 may be implemented as a programmable deterministic finite state machine (FSM). A FSM is defined by an alphabet of symbols, a finite number of states in which it might exist at any time, and a transition function that defines, for each current state and received input symbol, an action to perform and a new state into which the FSM should transition. In the context of the present invention, the alphabet of symbols may be defined as the bit patterns of each packet of input data and the metadata, and the states and transition function may be defined by the particular algorithm that is desired to be performed on the data stream. Note that one particular action of the FSM may be to send a signal on the control bus 42 to indicate that the computation has been completed, thus providing for out-of-band signaling of computational success.

While illustrative embodiments of the invention described herein refer to a deterministic FSM, it will be appreciated that other embodiments may implement the computing circuit 414 differently. For example, the computing circuit 414 may be implemented as a non-deterministic finite state machine in which the transition function includes a plurality of actions that might be performed for each current metadata and received input datum. Each particular action may be chosen by an upstream PE as described below in connection with FIG. 7, or it may be chosen probabilistically as a function of how frequently each action should be performed. Alternately, some layers of a spatial-temporal embodiment may implement the computing circuit 414 as an integrator (or even as a leaky integrator) that "fires" a signal to the next PE on a particular channel only when an intensity or magnitude of the incoming data has been at a high enough level for a long enough time.

Algorithmic state at any given time is reflected by a combination of 1) the internal states of the computing circuits, 2) the memory locations of the various data in the data stream, and 3) the metadata that accompany each datum. This algorithmic state changes as the algorithm progresses, and different PEs represent different parts of an algorithm. Therefore, a transition function is defined for each programmable computing circuit 414 as a function of its position in the sequence. Because the PEs 41 are arranged in a physical sequence inside the DPU 40, the position of the step in the algorithm is equivalent to the position of the PE 41 in the sequence. For this reason, the transition functions of the computing circuit 414 may be viewed as being a function of the physical position of the PE 41 in the sequence.

A transition function logically corresponds to a table lookup, where a first column of the table corresponds to an encoding of a current state of the PE 41, the metadata received from the previous PE, and/or the data received from upstream, while the second column corresponds to an encoding of an action to take, a new state for the PE 41, and a metadata signal to transmit to the next PE downstream. The computing circuit 414 advantageously may be implemented using a content addressable memory (CAM), although this is not required. Other implementations of the computing circuit 414 may be used in accordance with the scope of the invention, if they provide the same functionality as described herein.

The data output channel 415 may be implemented as a data bus having the same width as the data input channel 412, and the metadata output channel 416 may be implemented as a data bus having the same width as the metadata input channel 413. In this way, it is possible to couple the data input channel 412 to a data output channel 415 of a preceding PE, and to couple the metadata input channel 413 to a metadata output channel 416 of the preceding PE. The data input channel and the metadata output channel may be manufactured as a single data bus; likewise, the data output channel and the metadata output channel may together comprise a single data bus.

The metadata channel may include signals that represent various aspects of the (partial) computation. For example, in a pattern-matching algorithm, the signals may indicate that a partial match has been obtained. Each processing element may use this information to generate new metadata that is also a function of both the input data and the old PE state. Because the new metadata build upon the old, the DPU 40 may hierarchically form metadata of arbitrary complexity, representing the intermediate state of computations of arbitrary complexity.

As an illustration of this sort of complexity hierarchy, the metadata channels can be used to perform logic operations (i.e. OR, AND, NOT, XOR, and so on) among the metadata output of earlier PEs, so that the output of these logic operations become further, hierarchically-constructed metadata. For example, suppose a bit of metadata starts out equal to zero, then passes through several PEs that are each configured to detect a different condition. If any of the PEs detects its condition, its sets the bit of metadata equal to 1, while none of the PEs clears its value. The value of this bit after its associated datum passes through the several PEs will be 1 if and only if one or more of the PEs detected its condition. In other words, the metadata line has indicated a logical (nonexclusive) OR of the various conditions. As another example, suppose the bit of metadata is initially equal to 1, while each of several PEs is configured to set the value of this bit to 0 if its condition is NOT met. If and only if the value of the metadata bit is still 1 after passing through all PEs, all of the associated conditions must have been met—this example implements a logical AND. Other logical operations may be implemented similarly.

As another illustration of channel use, it is possible to provide algorithmic repetition by feeding back or feeding forward metadata and/or data channels. In a feedback configuration, the metadata or data of a given PE is provided to an upstream PE to further refine the output of the given PE. As an example, in an image or video processing embodiment, a PE or sequence of PEs can detect an edge in an image. The detection is indicated using the metadata channels. Once detected, the image data may be recycled through the same PEs using a subtractive algorithm to clean up the received image, akin to an edge filter. Other sorts of filter-like behavior using feedback is possible. Feed forward configurations operate in a similar fashion, except that the metadata and/or data channels are simultaneously provided to two downstream PEs and different locations in the temporal memory sequence.

The design of the DPU 40 has a large number of advantages over prior art data stream processing technologies. Unlike existing systems, a DPU 40 has minimal fan-out. Some data signals in current architectures require delivery to a large number of dispersed subsystems, and the connecting circuitry "fans out" from the source. However, each input that connects to a given output signal draws a current, and if too many inputs are connected then the direct current draw exceeds the output current capacity, causing a voltage drop and signaling errors. Moreover, real circuits have a capacitance that slows the transition from one signal state to another, causing propagation delays that limit throughput speed. By contrast, the architecture of the DPU 40 is linear, both in its temporal and spatial-temporal embodiments, and the effects of fan-out are therefore minimized. Data packets can be clocked through at extremely high speeds. Moreover, less fan-out means more of the silicon real estate can be devoted to processing logic, and less to circuit routing. The decrease in capacitive load also reduces power requirements.

As another advantage, the DPU 40 provides processing gains over existing technology. Each processing element 41 operates on its own packet of data independently of each other PE 41 on every clock cycle, thereby allowing massive parallel processing. Each bit of the metadata bus may be assigned a semantic meaning, like a variable in a traditional sequential logic. Because every PE 41 has access to the metadata bus, different parts of the computation may easily share these metadata variables.

The operation of DPU 40 is typically deterministic. Therefore, unlike prior art systems, the DPU 40 does not require elastic buffers or lossless flow control, although such flow control could be provided by processing elements if desired. Packets of data may enter the DPU 40, travel from each PE 41 to the next PE 41, and exit the DPU 40 according to a single system clock signal. Thus, once the first data packets have been buffered into the DPU 40, incurring a small latency, every subsequent clock cycle produces a completed computation for one more data packet. And if multiple computations are provided in a single DPU 40, then every subsequent clock cycle produces a completed computation for each such computation.

The DPU 40 may be manufactured as an application-specific integrated circuit ("ASIC") die on a semiconductor wafer using conventional techniques, or may be implemented using a field programmable gate array ("FPGA"). These techniques permit the DPU 40 to contain hundreds or thousands of individually-configurable processing elements. The circuitry of each PE 41 can be manufactured to be identical to the circuitry of each other PE. However, the computing circuit 414 of each PE 41 can be programmed independently of each other computing circuit, thereby providing tremendous algorithmic flexibility.

Because the DPU 40 may be manufactured in the form of a chip, it may be, for example, installed on a PCI card and placed in an off-the-shelf, traditional computer system. Moreover, several DPUs may be placed on a single PCI card in parallel, permitting several computations to be performed on a single input data stream at once by a single card. Also, because DPUs are modular units, a computer server may install several such PCI cards to increase parallelism.

Regular Expression Matching

Figure 5:
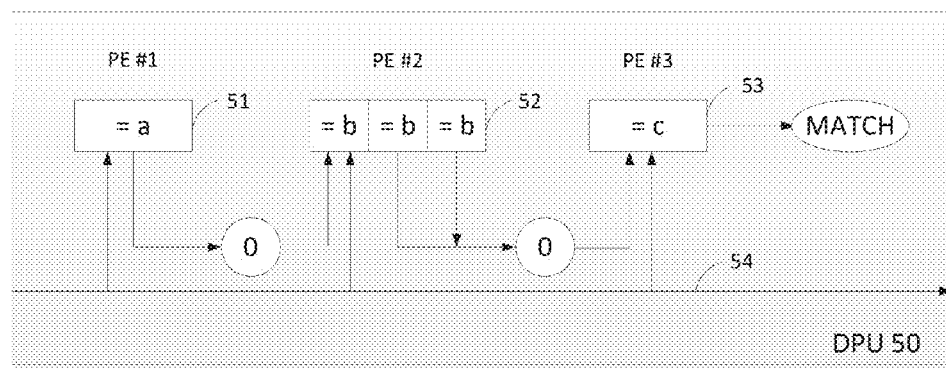
FIG. 5 schematically shows an implementation of a regular expression matcher using a data stream processing unit (DPU) according to one embodiment of the invention.

Implementation of particular use cases are now provided, to illustrate how to use a DPU. FIG. 5 schematically shows an implementation of a regular expression ("regex") matcher using a DPU 50 according to one embodiment of the invention. This DPU 50 is designed to generate a "MATCH" signal when it detects, anywhere in a stream of data, the regular expression/ab{2,3}c/. This regex matches the character "a", followed by either two or three letter "b"s, followed by the letter "c". That is, it matches exactly two strings, namely "abbc" and "abbbc". This simple expression is used only as an example of a general principal: any regex, no matter how complex, may be implemented with a DPU having a sequence of processing elements. Moreover, even this simple example is unnecessarily complex, as it can be implemented using two processing elements (one for each string to be matched), rather than the three processing elements described below. Also, the metadata stream lags one processing element behind the data stream, as described below. However, the description herein is more lengthy for the purpose of explaining the operation of the system, and therefore does not include such optimizations as might be made by a person having ordinary skill in the art.

The example DPU 50 uses only one bit for metadata signaling (bit 0 of the metadata bus); it should be understood that other DPUs may use more signaling bits. The DPU 50 operates by storing, in metadata bit 0 of the metadata following each byte of input data, whether the preceding byte completed the regex match up to that point in the matching process. It should be appreciated that the changing partial computational state may be different for each byte in the data stream. Thus, the position of each datum in memory (or equivalently, the time each datum reaches a given memory location) is crucial, because its corresponding metadata, which pass between memory locations in step with it, may be different for each position in memory that the datum passes through.

The DPU 50 has three PEs 51, 52, 53. These three PEs correspond to the three different matches /a/, /b{2,3}/, and /c/ respectively in this example. More complex regular expressions may be broken down in a similar fashion to form a sequence of PEs. In the general case, the process of breaking of a regular expression into smaller components may be performed by a compiler. The constraints on a regex compiling process are: the size and complexity of the regular expressions, the degree of commonality between expressions allowing for shared PEs, the width of the signal bus, and the number of PEs available in the DPU.

The DPU 50 operates as follows. The data stream passes through the DPU 50 along the data bus 54 without modification by the PEs 51, 52, 53. Each byte in the input data stream passes first to a first PE 51. This PE 51 compares the byte against the character "a"; if there is a match, the computing circuit of PE 51 annotates this byte as having matched the regex so far by setting the metadata bit in the following cycle so that the metadata representing the occurrence of "a" will arrive at PE 52 concurrent with the subsequent datum. If there is no match, the computing circuit of PE 51 clears the subsequent metadata bit (i.e., sets it to 0) in a likewise manner. Thus, after each byte passes through PE 51, the subsequent metadata bit reflects whether the byte has matched the partial regex /a/.

Next, each byte (and its metadata) passes to a second PE 52. This PE 52 reads and clears the metadata bit. If this bit has value 0, then the associated byte did not match the partial regex, and the current byte is ignored. If the bit has value 1, then PE 52 attempts to match a string of two or three consecutive "b" bytes. To this end, it tests whether the associated byte is "b", resetting its internal state if false, and incrementing it if true. If the next byte is also a "b" (and the string so far is "abb"), then PE 52 sets the metadata bit to indicate that the expression is positive, and further increments its internal state. It then waits for the next byte to arrive, tests whether it also is a "b", and resets its internal state. If this byte also is a "b" (and the string so far is "abbb"), then PE 52 sets the metadata bit of the following byte, indicating that the expression is again positive. In this case, two consecutive bytes in the data stream will have their metadata bits set. Thus, after each byte passes through PE 52, its metadata bit reflects whether the associated byte is the last byte of a match of the partial regex /ab{2,3}/. In this way, the transition function for PE 52 operates as a function of a sequence of received input data signals and received input metadata signals.

Next, each byte (and its metadata) passes to PE 53. PE 53 reads and clears the metadata bit. If this bit was 0, then the preceding data bytes did not match the partial regexes "abb" or "abbb", and the current byte is ignored. If the bit was 1, then PE 53 tests whether the next byte is "c". If the next byte is a "c", then that byte is the last byte of a match of the entire regex /ab{2,3}c/, and a MATCH signal is generated.

The MATCH signal may be generated in-band by setting bit 0 of the metadata bus or altering the data bus, so that a downstream PE or controller (not shown) can use this information. Alternately, the MATCH signal may be generated using out-of-band circuitry in the DPU 50. If the DPU 50 is implemented using a PCI card as described above in connection with FIG. 4, the out-of-band circuitry may connect to match processing circuitry elsewhere on the PCI card (not shown) that may, among other things, indicate to an external computer system the offsets into the data stream at which the first and/or last byte of the matched regex occurred. Also, while it was not necessary to show in this simple example, it will be appreciated that the DPU 50 may receive not only the data stream 54 from an upstream DPU and pass its output to a downstream DPU, but the DPU 50 also may receive the corresponding metadata stream (including metadata bit 0) from an upstream DPU, and pass the metadata stream to the downstream DPU. A DPU in accordance with an embodiment of the invention passes the data and metadata information together in parallel.

A person having ordinary skill in the art of regular expressions will appreciate that any such expression can be implemented using a sequence of processing elements as described above. One must be careful to identify any recursion or reentrant behavior that may occur while implementing a regex processor. For example, to match a sequence of three or more "a"s, a processing element first identifies the first string of three "a"s and annotates the third "a" as a partial match. However, it must continue to annotate each successive "a" until an input other than "a" is encountered. Note that doing so does not significantly increase the number of states of the state machine used to implement such a PE.

In general, a DPU 50 for detecting regexes may include tens, hundreds, or even thousands of PEs, and not just one but dozens of metadata bits, depending on the number of the regexes to be detected in the data stream. Thus, for example, one metadata bit might indicate that the current data packet matches any partial regex, including a digit, an uppercase or lowercase letter, a special character, a non-letter character, any sequence of these, any combination of the above, or any other meaningful property of a data packet. Such partial matches may be created early in the DPU algorithm, and reused over and over again by downstream PEs because these bits accompany their corresponding data packets. As may been seen, metadata bits may be reused, or even repurposed. Also, because each regex may be evaluated independently of each other regex, processing may be made totally parallel by providing the same data stream to a number of regex-detecting DPUs coupled in parallel, or to a number of regex-detecting PEs coupled in parallel within the same DPU. This benefit may be had for arbitrary independent computations, not just regular expressions, but its usefulness should be readily appreciated in this context.

Cyber Security

Figure 6A:
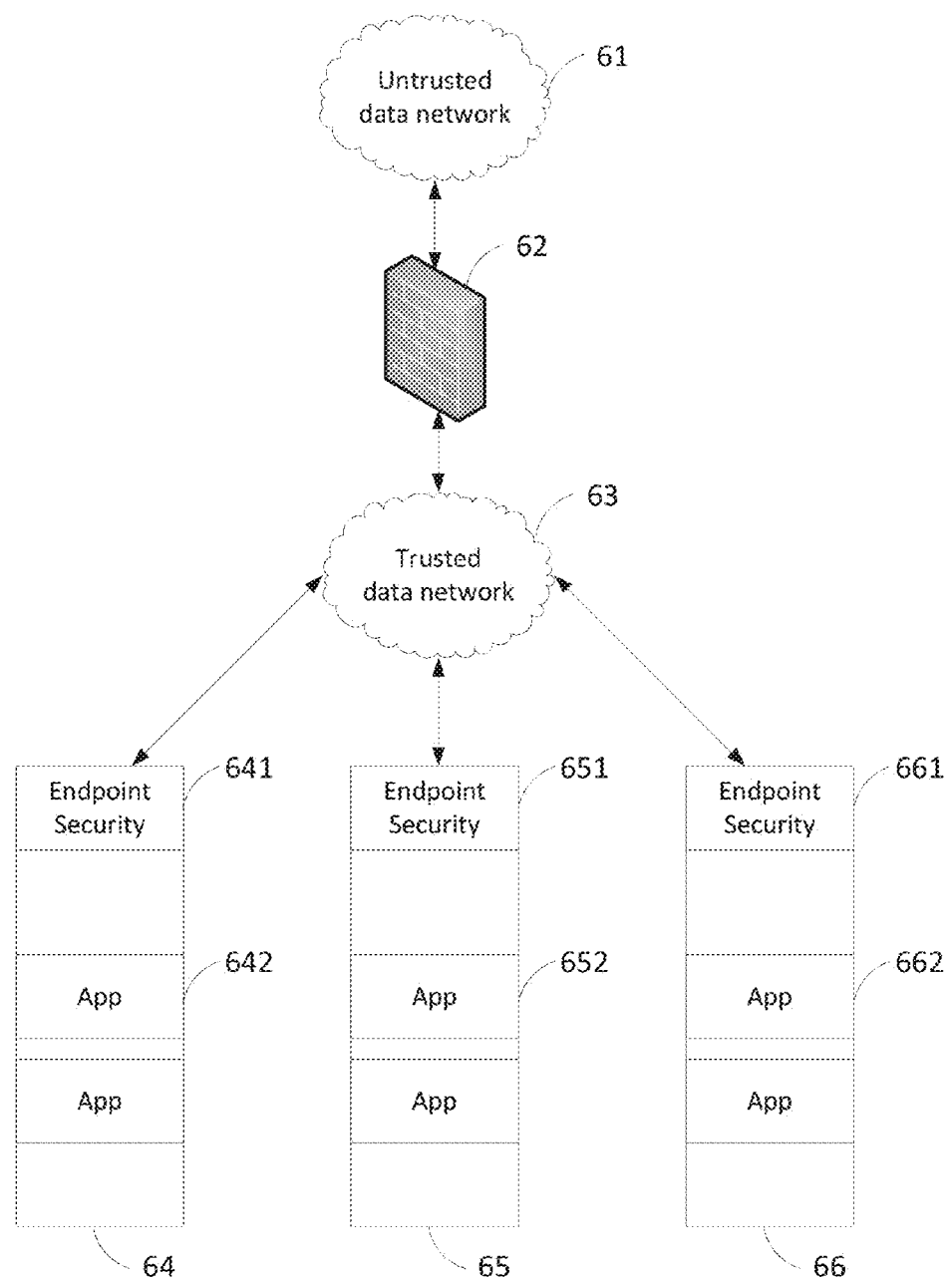
FIG. 6A schematically shows a simplified model of cyber security as known in the art.

Another use case for DPUs is cyber security. FIG. 6A shows a simplified model of cyber security. In this model, there are two kinds of security: network security and endpoint security. Data arrive from an untrusted data network 61, such as the Internet, bound for computing resources 64, 65, 66 which may be, for example, server racks containing a number of blade servers. However, before the untrusted data can reach these computing resources 64-66, they first pass through a firewall 62. The firewall 62 is a device known in the art that performs the function of authenticating the sender and receiver of data that pass through it, and authorizing the transmission of the data if the data match certain security rules. Thus, the firewall can be seen as providing network security. Data that successfully pass through the firewall 62 enter a trusted data network 63, and are transmitted from there to the computing resources 64-66. However, network security faces challenges from a number of sources, including an increased proliferation of mobile devices, computationally-expensive encryption requirements, cloud computing requirements, increasing bandwidth, and an increase in attack sophistication as time progresses, among other challenges.

Moreover, simply authorizing data to be passed through a firewall does not guarantee that the data itself are secure; for example, one authorized user may unknowingly send a virus to another authorized user. Thus, endpoint security is also required. Each computing resource 64-66 implements endpoint security, shown as boxes 641, 651, 661 respectively, using hardware, software, or a combination of hardware and software. These endpoint security functions typically are spread out among the computing resources 64-66 Scanning for trojans, viruses, worms, spyware, botnet software, phishing software, rootkits, persistent threats, evasion techniques, and social network attacks (among others) is still computationally expensive. The cost of executing millions of parallel scanning filters consumes more and more resources that should be used for applications 642, 652, and 662, and rapidly becomes cost-prohibitive.

Figure 6B:
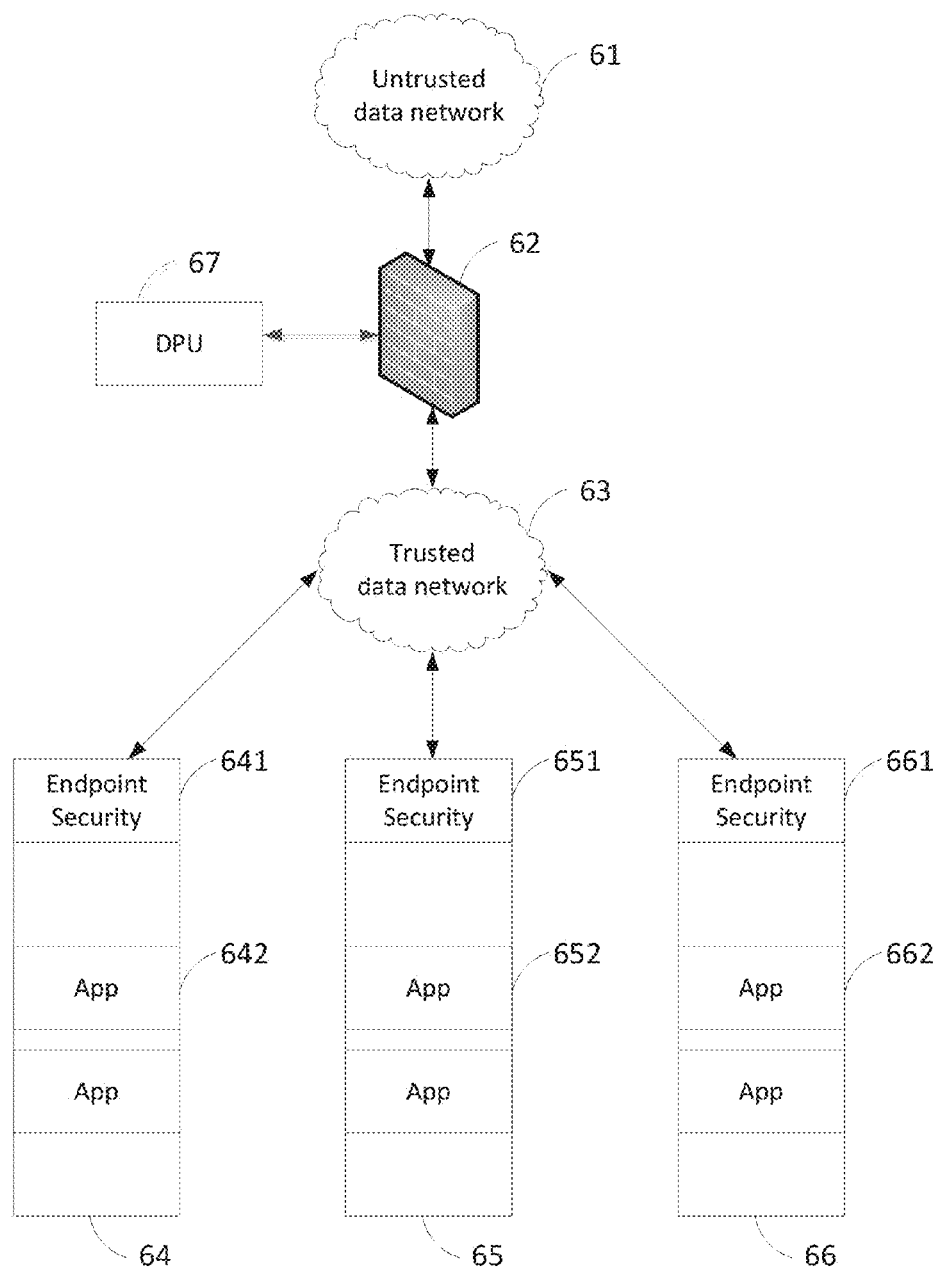
FIG. 6B schematically shows an improved model of cyber security using a virtual firewall in accordance with an embodiment of the invention.

FIG. 6B schematically shows an improved model of cyber security using a virtual firewall in accordance with an embodiment of the invention. It will be noted that much of the functions of the firewall 62 involve pattern matching: determining whether the source network address is authorized to transmit to the destination address, and searching for malicious signatures, for example. Thus, in accordance with this embodiment, the firewall 62 is augmented by including a DPU 67, for example on a PCI card installed into the body of the firewall, to perform network security functions. As data flow through the firewall, pattern matching functions such as those described above are offloaded to the DPU 67, which generates MATCH signals when certain patterns are detected. As described above in connection with FIG. 4, regular expressions may be used, so that matches of network addresses against subnet wildcard expressions is easily performed. Alternately, the DPU 67 may preprocess the network data, providing the network data stream with annotations (either in-band or out-of-band) that a traditional firewall may use to dramatically reduce its own per-signature execution cost.

The use of DPU 67 in conjunction with the firewall 62 provides a number of advantages over the prior art. For example, each new type of attack may be programmed into the DPU 67 without disturbing the operation of the computing resources 64-66, or in some configurations the operation of the firewall 62. Also, a number of DPUs 67 may be installed to recognize as many network security threats as are discovered, without noticeably impacting bandwidth. The DPU 67 itself may be isolated from reprogramming by any data stream originating from either the untrusted data network 61 or the trusted data network 63.

Figure 6C:
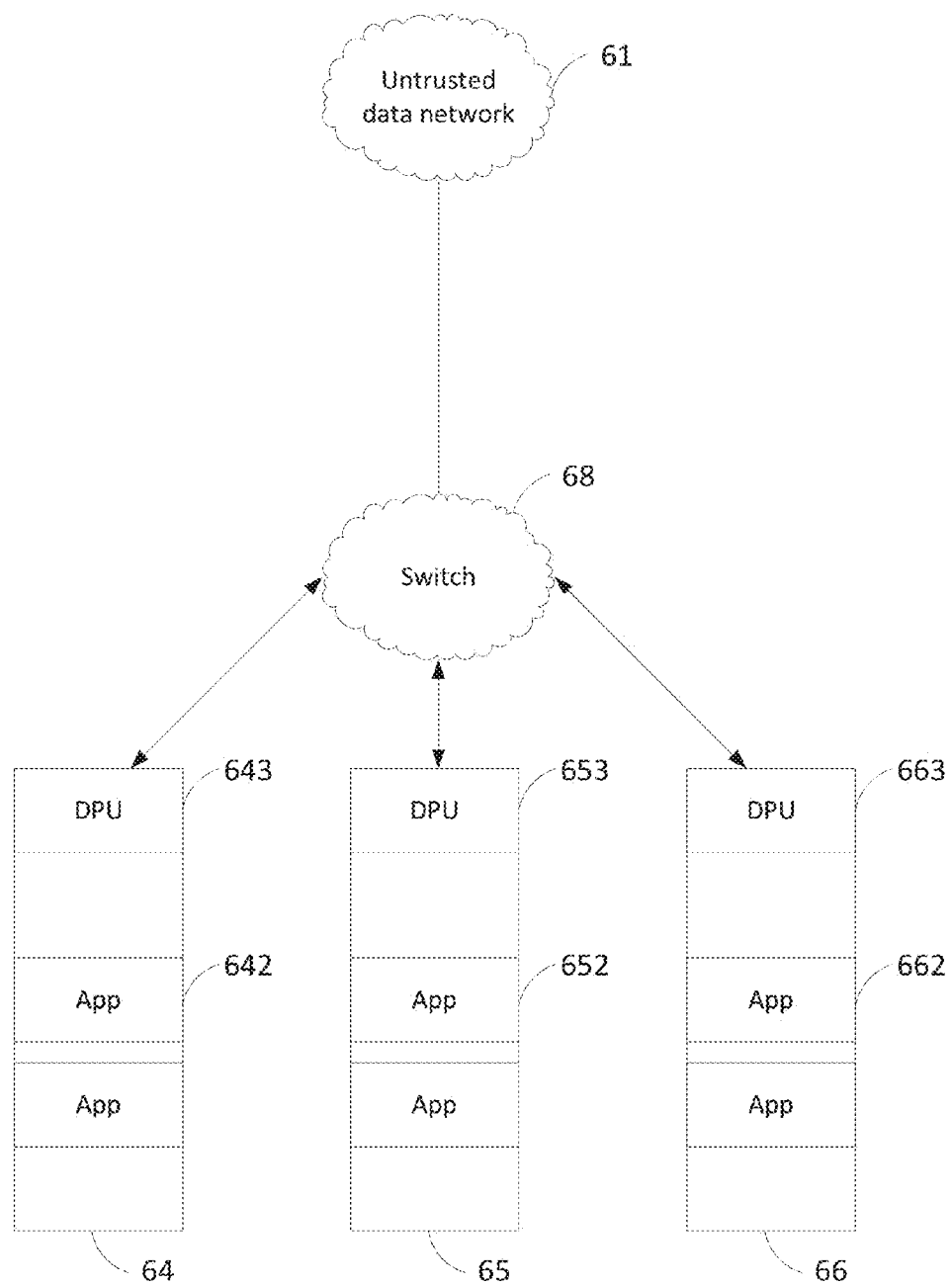
FIG. 6C schematically shows another improved model of cyber security using an in-band DPU according to another embodiment of the invention.

However, a DPU can also perform the functions of endpoint security, because scanning for trojans, viruses, black list, white list and so on may be accomplished using pattern matching. With this observation, FIG. 6C schematically shows another improved model of cyber security using a DPU according to another embodiment of the invention. In this figure, the firewall 62 has been entirely omitted, as its functions are provided by DPUs 643, 653, 663 installed in each of the respective computing resources 64, 65, 66. The functions of the trusted data network 63 have been transitioned to the edge of the network. Moreover, DPUs 643, 653, 663 also provide endpoint security by scanning for malware, active attacks and other threats. This solution is a vast improvement over the prior art because the design of DPUs permits data to be processed sequentially as a stream with much greater efficiency that traditional computing architectures. As with FIG. 6B, control over the programming of DPUs 643, 653, 663 may be isolated from the applications 642, 652, 662 and from the untrusted data network 61.

Robotic Behavioral System

Figure 7:
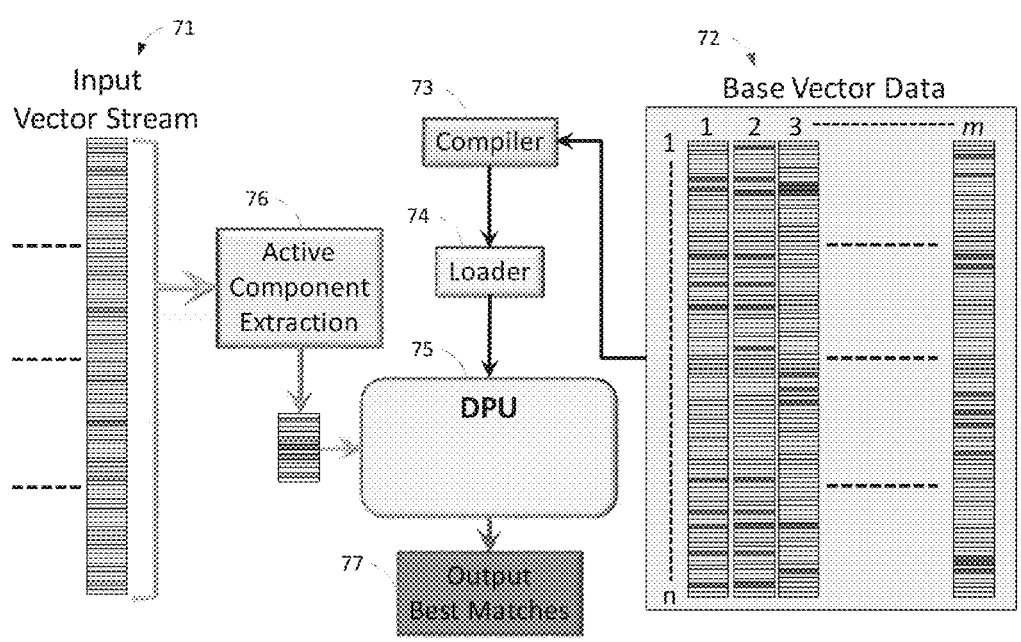
FIG. 7 schematically shows the components of a robotic behavioral system in accordance with another embodiment of the invention.

FIG. 7 schematically shows the components of a robotic behavioral system in accordance with another embodiment of the invention. A robot typically has a collection of sensors, such as cameras and microphones, to obtain information about its surroundings. Sensor data arrive as an input vector stream 61. Input vectors are generally sparsely populated, but each element of an input vector may have a magnitude that indicates the strength of a sensed environmental factor.

In a training phase of operation, the robot is trained to operate safely by a human operator providing manual guidance around an enclosed training space. Sensor data from this training is stored in a database as base vector data 72, including actions to take in case each given base vector is encountered. For example, if vector 1 is detected, then an obstacle is present and the robot should turn to the right to avoid it, but if vector 2 is detected then the robot may proceed straight ahead. Each base vector has a given length n corresponding to given sensor input data, and there are m such base vectors in the base vector data 72 corresponding to a number of different trained scenarios. The values of n and m may vary, for example, as a function of the quantity of data produced by the robot's sensors and the sophistication of training. In one embodiment, for example, the value of m is limited to $2^{16}$, or 65536, and the number of active elements of each base vector is limited to 15.

In an autonomous phase of operation, the robot is placed into a testing environment, and must navigate safely through the testing space to accomplish one or more objectives. The robot navigates safely in part by comparing the input vector stream 71 to the base vector data 72. In particular, the comparing process attempts to find a base vector whose entries are closest in magnitude to the sensed input vector. Since guidance, navigation, and control are dynamic operations, processing the input vector stream 71 must be done in real time. Weight, power consumption, and size are also considerations.

In prior art systems, the input vector stream is provided to a traditional computing system, which compares each input vector to each base vector. While some optimizations can be made, the complexity of each comparison is approximately proportional to the size of the base vector data 72. Moreover, this process must be repeated for each input vector. Since the input vector stream 71 may include many millions or tens of millions of bits of data per second and the base vector data 72 may also include many millions of bits, this process may require tens or hundreds of trillions of calculations per second to be performed in real time. This may be achieved using a supercomputer having computing nodes configured according to technology known in the art. Use of such a supercomputer may require these enormous amounts of sensor data to be transmitted wirelessly from the robot, and the response must also be transmitted back. It is possible that responses may not reach the robot before a collision or other unsafe event occurs, or that environmental conditions do not allow for sufficient communication.

However, in accordance with the massively parallel processing enabled by an embodiment of the invention, speed of processing can be dramatically increased and the size, weight, and power consumption of the computing elements could be reduced to fit onboard the robot. The components of this system are shown in FIG. 7. During the training phase of operation, the base vector data 72 are stored. When training is complete, the base vector data 72 are provided to a compiler 73 that compiles the base vector data 72 into a series of commands for processing elements of a DPU. These commands encode, for each base vector, which components of the (sparse) base vector are non-zero, and their respective magnitudes. These tables are then loaded, using a loader 74, into the processing elements of a DPU 75. The robot uses an active component extraction module 76 to extract only the active components from the sparse input vectors it receives from the environment, and provide them to the DPU 75. As the active components pass through the DPU 75, each processing element operates on each vector in sequence, and the DPU 75 outputs best matches 77 as the input vectors exit the DPU 75.

The processing elements of the DPU 75 operate by comparing the addresses of active components of the input vector against a base vector, and storing relative magnitudes in the data stream itself. If the address of an active component of the input vector matches the address of an active component of a given base vector (as stored in the commands for a given processing element), then a magnitude difference is calculated between the components, and the data stream itself is modified to reflect this magnitude. If the address of the active component of the input vector does not match the address of an active component of the processing element's base vector, then an address offset is calculated and sent in the signal stream to a subsequent PE for further analysis. This example demonstrates the ability of a DPU 75 to support non-deterministic finite automata: here, an upstream PE provides a "vector" or "jump address" to a downstream (non-deterministic) PE that alters the behavior of the downstream PE. At the end of processing, the magnitude differences of the matching components are summed with the unmatched magnitudes, and the best matching base vector is updated.

Performance of the DPU 75 in such a system shows dramatic improvements over prior art systems. FIG. 8 shows a normalized performance comparison of a DPU according to the embodiment of FIG. 7 with a rack of blade servers from Hewlett-Packard of Palo Alto, Calif. The DPU 40 was emulated as both an FPGA and as an ASIC. As can be seen from the first row of FIG. 8, a single FPGA DPU is projected to be 1250 times faster than a production AMD 6380 processor, while an ASIC DPU is projected to be 100,000 times faster. The cost, power, volume, and weight comparisons were normalized against the throughput of a 32 blade rack of 6380 processors, and the DPU processing solution saves several orders of magnitude in each of these metrics. In particular, to achieve the equivalent data throughput as the rack, the ASIC implementation was projected to cost almost six orders of magnitude less, operating at four one-millionths of the power, in a space 4.5 million times smaller, being 8.6 million times lighter. Even the less efficient FPGA implementation drastically outperformed the rack solution in the simulation.

Spatial-Temporal Example: Video Processing

Figure 9:
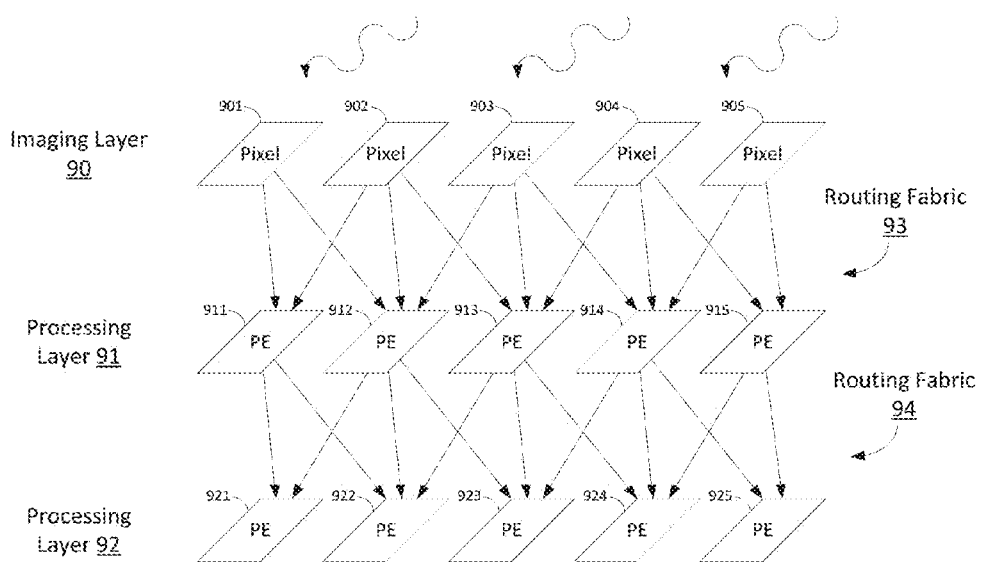
FIG. 9 schematically shows a spatial-temporal arrangement of processing elements that demonstrates fan-in and fan-out.

In addition to the processing described above, in which data and metadata are processing according to a temporal (streamed) relationship, various embodiments of the invention also permit spatial relationships to be processed. FIG. 9 schematically shows a cross section of a spatial-temporal arrangement of processing elements that demonstrates fan-in and fan-out. This arrangement, which may be used in video processing, includes several layers that each have spatial properties. In particular, there is an imaging layer 90, a processing layer 91, and a second processing layer 92.

The imaging layer 90 images incoming incident light using an array of pixels 901-905. Each pixel converts impinging light into a digital color signal (e.g., red-green-blue values or grayscale values) in accordance with techniques known in the art. While for simplicity FIG. 9 shows only a cross section having five pixels 901-905, it will be understood that a commercial embodiment may have thousands or millions of pixels or more, and that these pixels may be arranged in any geometrical pattern, a rectangular array being the most common.

The digital color signals of each pixel act as input data for the first processing layer 91. To capture the spatial relationship between pixels, each pixel sends its color data signal to a plurality of processing elements 911-915 in the processing layer 91, according to routing fabric 93. This routing fabric 93 may be implemented using fixed circuit paths for maximum processing speed. Alternately, the routing fabric may be programmable, so that the processing elements that receive the digital color signals from any given pixel may change over time. In either case, each processing element 911-915 has a plurality of data input channels and is configured to receive and operate on a plurality of input data. Each such processing element therefore fans-in data from the plurality of pixels 911-915 according to a spatial relationship that is captured by the routing fabric 93.

Each processing element 911-915 in processing layer 91 operates on the input data from several pixels to produce initial metadata. In one embodiment, the metadata might be as simple as indicating whether the input signal is above or below a certain threshold. Or, the first processing layer might perform spatial or temporal correlation or temporal decorrelation of the input image data, similar to the lateral geniculate nucleus (LGN) of the human brain. However, any such spatial or temporal processing might be performed.

The output signals from each processing element 911-915 in the first processing layer 91 is then routed to the second processing layer 92 using a routing fabric 94. Thus, each processing element 911-915 may demonstrate output data and metadata fan-out. As with routing fabric 93, the routing fabric 94 may be used to encode spatial or temporal relationships between processing elements. The processing elements 921-925 of the second processing layer 92 receive the fanned-out output data and metadata from the first processing layer 91 as fanned-in data and metadata, and each performs further desired processing on its inputs. For example, the second processing layer 92 might perform orientation detection as occurs in region V1 of the human visual cortex. Or, the second processing layer 92 might some other function related to the processing of video.

While only two processing layers are shown, it should be appreciated that embodiments of the invention may include many such layers, each layer performing a function related to the overall processing requirements of a desired application. Successive processing layers may thereby cooperate to perform extremely complex calculations on vast amounts of raw input data in real-time. It should be observed that any given path from the imaging layer 90, through the processing layers 91 and 92 and any successive processing layers, has the property of being a temporal data stream, so that both spatial and temporal data are processed simultaneously in the distributed architecture of FIG. 9.

In fact, each processing element in this arrangement simultaneously operates on new data at each clock cycle, so that the arrangement may be viewed in one aspect as an extremely dense supercomputing system. However, it should also be recognized that this system may be programmable, so that the massively parallel processing capabilities of the processing layers may be applied more generally. Thus, for example, one might replace the pixels 901-905 of FIG. 9 with audio inputs and reprogram the processing layers 91, 92 and routing fabrics 93, 94 to perform advanced audio computations, using the same hardware processing elements. In this way, it should be seen that the arrangement is not application-specific, and is a general computing architecture.

It also should be appreciated that, according to the needs of a particular application, any given processing element may receive data fan-in, metadata fan-in, or both. If plural data are received in a given processing element, its computing circuit may operate on the plural data together with a single (or multiple) metadata inputs to produce an output datum and output metadata. Likewise, if plural metadata input channels are provided in a processing element, its computing circuit may operate on the plural metadata together with a single (or multiple) data to produce an output datum and output metadata. Similarly, any given processing element may fan-out its data, metadata, or both to a plurality of successive processing elements according to whatever routing is required. As described above in connection with FIG. 4, temporal buffering may be used in the spatial-temporal case to introduce latency in the data and metadata signals, for example to change the arrival order of information.

Context-Switching

In many practical environments, the data stream includes data from multiple contexts. For example, a computer may transmit data across a network from multiple application instances, executing simultaneously. The instances may be, for example, one user running several different applications (e.g., social networking applications), multiple users running different instances of the same application (e.g., a virtual machine application), or most generally, multiple users running different instances of different applications. Each application instance operates in a different context, having a different internal state than all of the others, and data sent and received by one such application instance might be useless to the other application instances. Nevertheless, these data are received by a single computer, often using the same physical cable or connection, so the computer must have a mechanism to direct received data to the different application instances.

To facilitate data communication between application instances, the prior art uses sessions. A "session" is a logical transaction that spans multiple data communications between two or more application instances that have different contexts. The data communications from several such sessions may be multiplexed into a single data stream, for example, by adding a "session header" to the data before or while it is being prepared for transmission, or using other known techniques. Each transmission of data is associated with a "session identifier" which, in combination with other information (such as an Internet Protocol or IP address of the transmitting computer, or the name of a socket), uniquely identifies the context of the application instance. Received data are demultiplexed using the session identifiers, and the resulting data are routed to the application instances that need them.

In DPU embodiments of the invention described above, each processing element includes a finite state machine whose state is modified by data as it passes by. If the data pertain to multiple sessions, a processing element whose state is a function of the data of one session would be incorrect if applied to data from another session. One possible solution is to flush the DPU pipeline, save the current state of all processing elements, possibly reprogram the DPU to perform a different task, load a new state into all processing elements, and refill the pipeline. This type of context switching introduces latency into the DPU due to the need to empty and refill the pipeline, and artificially constrains the usable number of processing elements. Another possibility is to use multiple DPUs, one per session, and demultiplex data prior to processing. This solution artificially constrains the usable number of sessions that may be simultaneously processed, based on cost or hardware real estate; as these are external constraints, it may not be possible in a given application.

Therefore, various embodiments of the invention modify the data stream to insert context identifiers. These identifiers enable the computing circuit of each processing element to switch contexts (i.e. to change the program it is executing, or to change the active state of the program it is executing) as the data pass by. In this manner, the data stream does not need to be demultiplexed. Instead, as a block of received data passes through a DPU, the processing elements are alerted to switch contexts according to that data's session. Thus, a single DPU may be simultaneously operating on data having many different contexts. A "rolling" context switch at the level of a processing element may require as little storage and latency cost as storing a single program counter for the active context in an attached memory circuit, and retrieving a program counter for the new context from the memory circuit.

Various embodiments of the invention also may insert additional packets into the data stream. These extra packets may provide a processing element with sufficient latency to enable the context switch. Or, they may provide in-band storage of metadata, resulting from performance or partial performance of the computation, that travels with the data. Such in-band stored metadata may include, for example in the cyber security use case described above, an indication that a particular data communication had a virus or rootkit.

Alternately, these additional packets may be used to reprogram a subset of a DPU's processing elements. In some cases, the new program may be included in the extra packets. In other cases, the new program may be stored in an auxiliary memory, or be provided to a processing element using other circuitry. The spatial-temporal processing described above is an example application where reprogramming is useful. Such processing involves running an array or stream of data through several layers of processing elements, each layer possibly changing the data. Rather than creating a physical, multi-dimensional array of processing elements, the stream of data may be run through a one-dimensional DPU several times, and metadata stored in the extra packets may specify multi-dimensional coordinates of a "virtual" processing element to next operate on the particular data. A physical processing element may use these metadata to adaptively reprogram itself according to the desired function, and thereby permit more efficient use of the DPU hardware. A person having ordinary skill in the art may appreciate other ways to use such additional packets.

Figure 10:
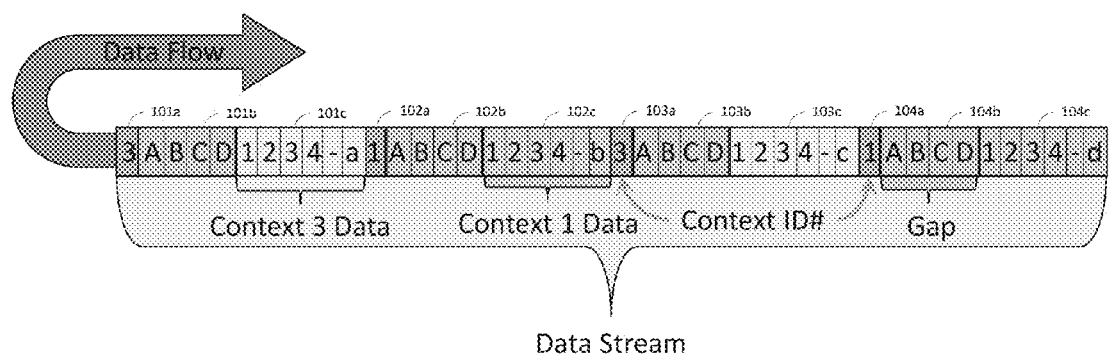
FIG. 10 schematically shows data in an exemplary data stream modified according to an embodiment of the invention to permit in-band context switching.

FIG. 10 schematically shows data in an exemplary data stream modified according to an embodiment of the invention to permit in-band context switching. Shown in FIG. 10 are two different contexts, identified as #1 and #3. Various embodiments may process data from any number of contexts, limited only by the available hardware. For example, one embodiment may accommodate up to 1024 simultaneous contexts.

In the example shown in FIG. 10, the first data sent through the data stream processing unit are from context #3, and are shown as packet groups 101a, 101b, and 101c. The next data are from context #1, and are shown as packet groups 102a, 102b, and 102c. The next data are from context #3 again, and are shown as packet groups 103a, 103b, and 103c. The next data are from context #1 again, and are shown as packet groups 104a, 104b, and 104c. It should be appreciated that the data stream may include additional data from more than two contexts (not shown).

In this example, the data are of three types: context identifiers, gap packets, and data packets. Each data stream packet has a fixed size determined by the width of the data channel, as described above in connection with FIG. 4. Data stream packet groups 101a, 102a, 103a, and 104a each encode a context identifier, and are inserted into the data stream prior to processing by the DPU. The context identifier may be, for example, a session identifier found in the header of a network data packet, the header itself (grouped into an appropriate number of data stream packets), or other such information reformatted as a data stream packet.

Optional data stream packet groups 101b, 102b, 103b, and 104b may be introduced into the data stream to provide a delay or gap in processing. Four such packets "A", "B", "C", and "D" are shown for each packet group, corresponding to a four clock cycle delay. Such packet groups may not be necessary, depending on the application. However, in some embodiments, for example cyber security embodiments in which a large number of different data patterns might match, the metadata bus may not be large enough to identify which virus or rootkit was identified, so these gap packets permit each processing element to annotate the previous group of received data by modifying the data stream itself, using in-band signaling information. Such annotations may include, for example, setting a particular bit in a particular packet (e.g., bit number 5 in packet "A") to indicate that the previous data communication matched virus XYZ, while setting bit number 0 in packet "C" indicates a match to rootkit RST. The inclusion of such packets in the data stream also may provide time for each processing element to perform a context switch, which may take multiple clock cycles to accomplish.

Data stream packet groups 101c, 102c, 103c, and 104c are the data actually received from their respective sources. As these data are application- and message-specific, any number of data stream packets may be present (as indicated in FIG. 10 by the lengths "a", "b", "c", and "d" respectively). Each processing element may include circuitry on which to receive a signal indicating that any particular packet is a context identifier. Alternately, the contextual data 101c, 102c, 103c, 104c may be encoded, for example, to include a length expressed as a number of packets, which may be stored by the processing element and decremented with each successive data stream packet.

Alternate embodiments may signal a context switch in different ways. For example, rather than inserting packets into the data stream, an embodiment may signal a context switch using a line on the metadata bus described above. In this embodiment, the metadata bus itself may provide the new context identifier, or this information may come from a different circuit. In another embodiment, the received data may be presented to the DPU using time-division multiplexing. In the TDM embodiment, the received data are provided at once to the DPU in fixed numbers of packets, rather than variable numbers, and each processing element determines at regular, synchronized intervals whether and how to change contexts.

FIGS. 11A-11I schematically show the sequential processing of the modified data stream of FIG. 10. These Figures each show four numbered processing elements. Each processing element operates according to an "active" context identifier. To permit context switching, each processing element also stores a "new" context identifier, as shown. Also each processing element is associated with a context memory 111, 112, 113, or 114 for storing data in association with up to "n" different contexts. For example, as described above, a typical value of "n" may be 1024, although other values may be used depending on the requirements of a particular DPU. Data past the processing elements in the direction indicated. Individual data packets are latched to allow each processing element to operate on them.

Figure 11A:
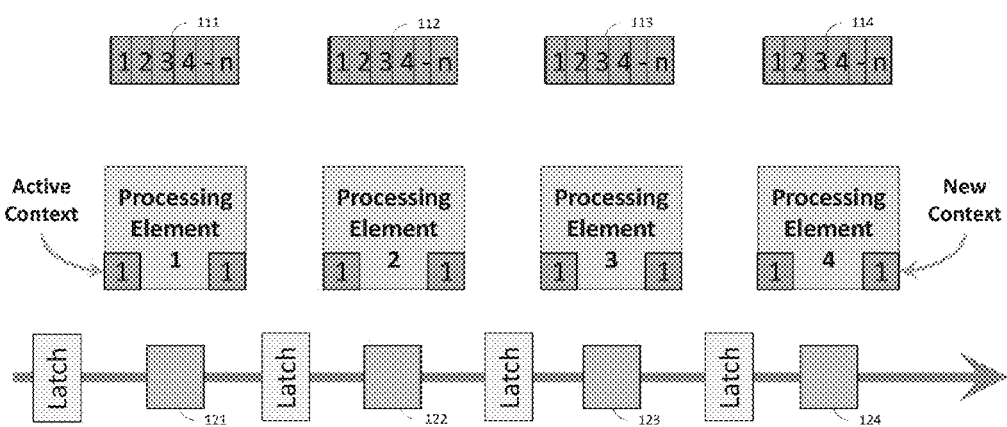
FIGS. 11A-11I schematically show the sequential processing of the modified data stream by the embodiment of FIG. 10.

FIG. 11A shows the state of a portion of the DPU before new data arrive. Each processing element has active and new context identifiers of "1". The four gray data packets 121, 122, 123, and 124 are the last four packets of context #1 that were received by the DPU.

Figure 11B:
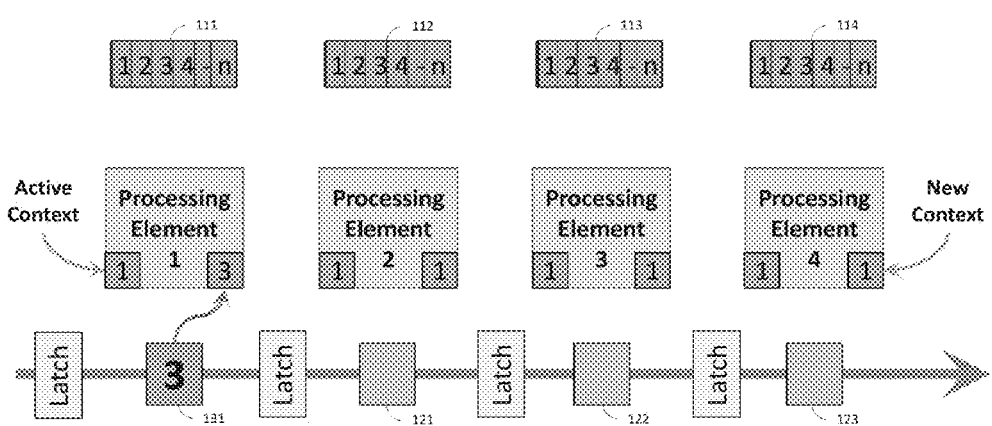

FIG. 11B shows the state of the portion of the DPU after the first data stream packet 131 is latched. This is a context identifier, so Processing Element 1 updates its new context to #3. Packet 124 has shifted out of view.

Figure 11C:
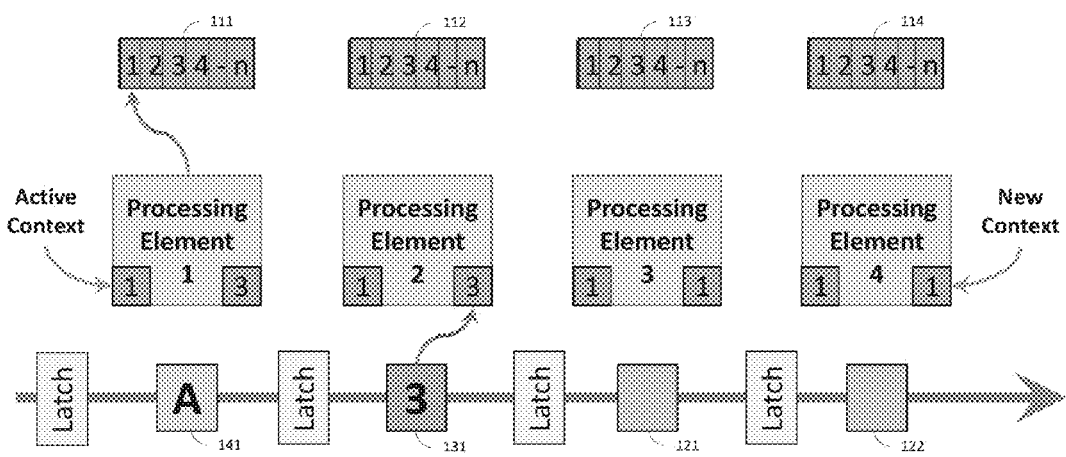

FIG. 11C shows the state of the portion of the DPU after the second data stream packet 141 is latched. This is a gap packet. Processing Element 1 begins to store its contextual state (e.g., a program counter for its finite state machine) to its associated memory 111. At the same time, packet 131 has reached Processing Element 2, which updates its new context to #3. Packet 123 has shifted out of view.

Figure 11D:
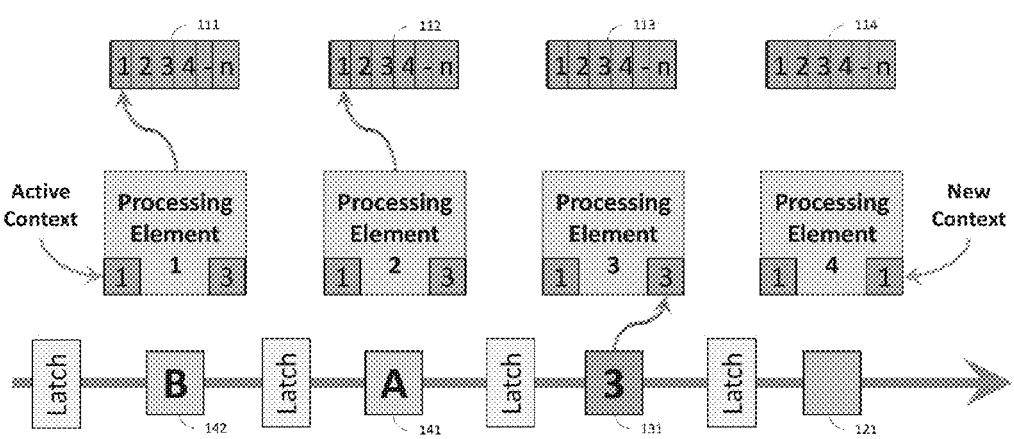

FIG. 11D shows the state of the portion of the DPU after the third data stream packet 142 is latched. This is another gap packet. Processing Element 1 finalizes storage of its contextual state to its associated memory 111. At the same time, Processing Element 2 begins to store its contextual state to its associated memory 112. Packet 131 has reached Processing Element 3, which updates its new context to #3. Packet 122 has shifted out of view.

Figure 11E:
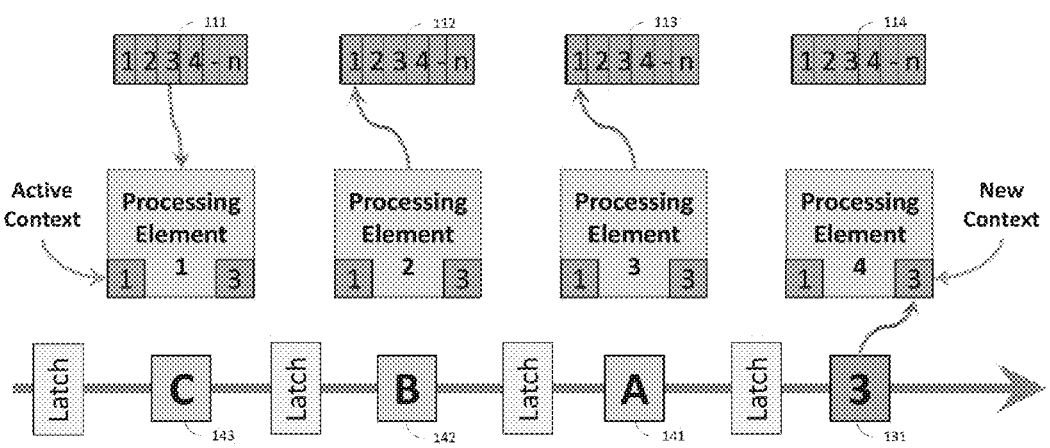

FIG. 11E shows the state of the portion of the DPU after the fourth data stream packet 143 is latched. This is another gap packet. Processing Element 1 begins retrieving new contextual state, associated with the new context, from its associated memory 111. At the same time, Processing Element 2 finalizes storage of its contextual state to its associated memory 112. Processing Element 3 begins to transfer its contextual state to its associated memory 113. Packet 131 has reached Processing Element 4, which updates its new context to #3. Packet 121 has shifted out of view.

Figure 11F:
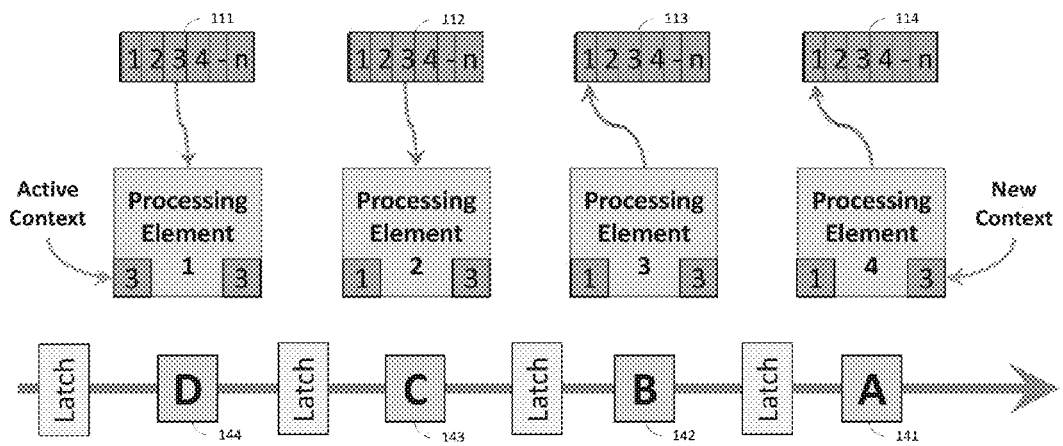

FIG. 11F shows the state of the portion of the DPU after the fifth data stream packet 144 is latched. This is the last gap packet. Processing Element 1 finalizes retrieving its new contextual state, and updates its "active" context to #3. Now, this processing element is ready to process data in context #3. At the same time, Processing Element 2 begins retrieving new contextual state, associated with the new context, from its associated memory 112. Processing Element 3 finalizes storage of its contextual state to its associated memory 113. Processing Element 4 begins to transfer its contextual state to its associated memory 114. Packet 131 has shifted out of view.

Figure 11G:
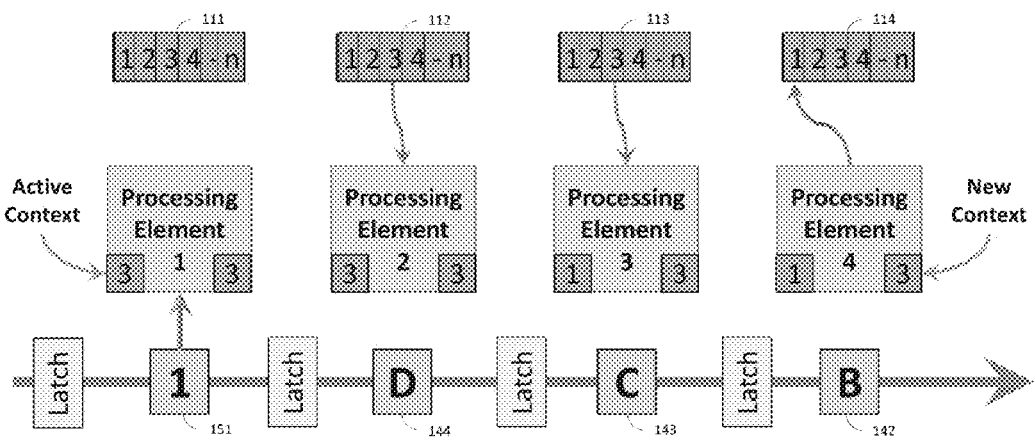

FIG. 11G shows the state of the portion of the DPU after the sixth data stream packet 151 is latched. This is the first data received in context #3, and Processing Element 1 processes it as described above. Processing proceeds according to the state retrieved from the associated memory 111, which was stored using these processes the last time data were received in context #3. At the same time, Processing Element 2 finalizes retrieving its new contextual state, and updates its "active" context to #3. Processing Element 3 begins retrieving new contextual state, associated with the new context, from its associated memory 113. Processing Element 4 finalizes storage of its contextual state to its associated memory 114. Packet 141 has shifted out of view.

Figure 11H:
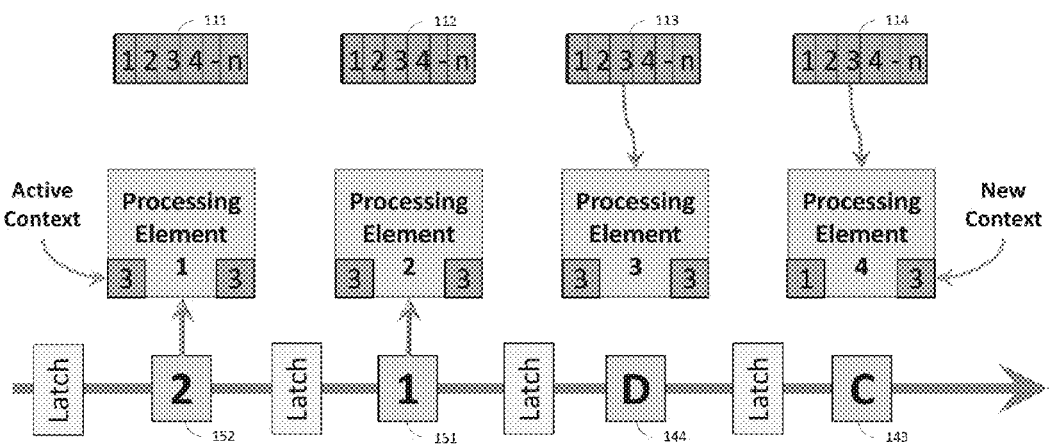

FIG. 11H shows the state of the portion of the DPU after the seventh data stream packet 152 is latched. This is the second data received in context #3, and Processing Element 1 processes it as described above. At the same time, data packet 151 has reached Processing Element 2, which processes it. Processing Element 3 finalizes retrieving its new contextual state, and updates its "active" context to #3. Processing Element 4 begins retrieving new contextual state, associated with the new context, from its associated memory 114. Packet 142 has shifted out of view.

Figure 11I:
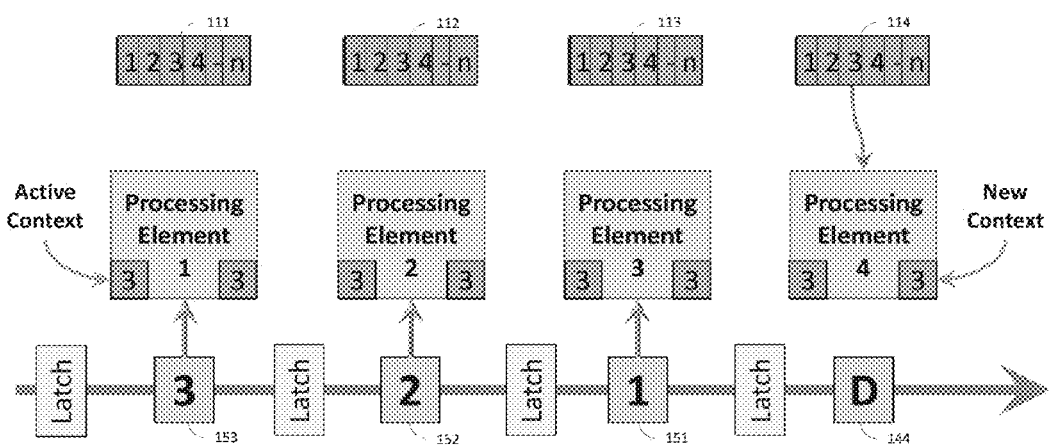

FIG. 11I shows the state of the portion of the DPU after the eighth data stream packet 153 is latched. This is the third data received in context #3, and Processing Element 1 processes it as described above. At the same time, Processing Element 2 processes packet 152. Data packet 151 has reached Processing Element 3, which processes it. Processing Element 4 finalizes retrieving its new contextual state, and updates its "active" context to #3. Packet 143 has shifted out of view. These processes continue for subsequent data stream packets in likewise fashion.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A data stream processing unit for performing a computation upon a stream of data that is organized according to a plurality of contexts, the data stream processing unit comprising:
   a plurality of processing elements arranged in a physical sequence, wherein each given processing element comprises:
   a first memory circuit;
   a data input channel, coupled to the first memory circuit, configured to receive into the first memory circuit an input datum in the stream of data from a coupled data output channel of a processing element preceding the given processing element in the sequence, the input datum being associated with a context in the plurality of contexts;
   a metadata input channel, coupled to the first memory circuit, configured to receive into the first memory circuit an input metadata signal from a coupled metadata output channel of the preceding processing element, the input metadata signal representing a first state of the computation;
   a computing circuit configured as a programmable finite state machine having a plurality of states that operates, as a function of a position of the given processing element in the sequence and the context, on the input datum and the input metadata signal to produce an output datum and an output metadata signal, the output metadata signal representing a second state of the computation that is different from the first state;
   a data output channel, coupled to the first memory circuit, configured to transmit the output datum to a processing element succeeding the given processing element in the sequence;
   a metadata output channel, coupled to the first memory circuit, configured to transmit the output metadata signal to the succeeding processing element; and
   a second memory circuit, coupled to the computing circuit;
   wherein the computing circuit is further configured so that, when a first input datum is associated with a first context but a next input datum is associated with a different, second context, the computing circuit (a) stores, in the second memory circuit, an active state of the programmable finite state machine in association with data identifying the first context, and (b) retrieves, from the second memory circuit, a new state of the programmable finite state machine according to data identifying the second context.

2. The data stream processing unit according to claim 1, wherein the finite state machine of at least one processing element is configured to be reprogrammed during the course of the computation.

3. The data stream processing unit according to claim 1, wherein the finite state machine of at least one processing element is further configured to produce an output datum that is different than the input datum, thereby modifying the stream of data received by a succeeding processing element in the sequence.

4. The data stream processing unit according to claim 1, wherein the computing circuit of at least one processing element in the sequence is further configured to introduce a latency into producing the output metadata signal.

5. The data stream processing unit according to claim 1, wherein a given processing element in the sequence comprises either or both of: (a) a plurality of data and metadata input channels that are configured to receive into the first memory circuit a plurality of input data and input metadata signals from a respective plurality of preceding processing elements, and (b) a plurality of data and metadata output channels that are configured to transmit the output datum and output metadata signal to a respective plurality of succeeding processing elements.

6. The data stream processing unit according to claim 1, wherein each context is associated with a session comprising a plurality of data communications, the stream of data includes, for each such communication, a session identifier and the communicated data, and wherein the computing circuit is further configured, for each such communication, to store the active state and to retrieve the new state after receiving the session identifier and before receiving the communicated data.

7. The data stream processing unit according to claim 6, wherein the stream of data includes, between the session identifier and the communicated data for each communication, a datum for annotating a prior communication, and wherein the computing circuit is further configured so that, when the input datum is the annotating datum, the finite state machine operates to produce an output annotating datum that annotates the prior communication.

8. A method of performing a computation upon a stream of data that is organized according to a plurality of contexts, the method comprising:
receiving an input datum, into a first memory circuit of a given processing element selected from a plurality of processing elements arranged in a physical sequence, from a processing element preceding the given processing element in the sequence, the input datum being associated with a context in the plurality of contexts;
receiving an input metadata signal, into the first memory circuit, from the preceding processing element, the input metadata signal representing a first state of the computation;
operating, by a programmable finite state machine having a plurality of states, as a function of a position of the given processing element in the sequence and the context, on the input datum and the input metadata signal to produce an output datum and an output metadata signal, the output metadata signal representing a second state of the computation that is different from the first state;
when a first input datum is associated with a first context but a next input datum is associated with a different, second context, (a) storing, in a second memory circuit, an active state of the programmable finite state machine in association with data identifying the first context, and (b) retrieving, from the second memory circuit, a new state of the programmable finite state machine according to data identifying the second context; and
transmitting the output datum and the output state signal to a processing element succeeding the given processing element in the sequence.

9. The method according to claim 8, further comprising reprogramming the finite state machine of at least one processing element during the course of the computation.

10. The method according to claim 8, wherein the finite state machine of at least one processing element produces an output datum that is different than the input datum, thereby modifying the stream of data received by a succeeding processing element in the sequence.

11. The method according to claim 8, further comprising introducing a latency into producing the output metadata signal.

12. The method according to claim 8, further comprising either or both of: (a) receiving into the first memory circuit a plurality of input data and input metadata signals from a plurality of preceding processing elements, and (b) transmitting the output datum and the output metadata signal to a plurality of succeeding processing elements.

13. The method according to claim 8, wherein each context is associated with a session comprising a plurality of data communications, and the stream of data includes, for each such communication, a session identifier and the communicated data, the method further comprising, for each such communication, to store the active state and to retrieve the new state after receiving the session identifier and before receiving the communicated data.

14. The method according to claim 13, wherein the stream of data includes, between the session identifier and the communicated data for each communication, a datum for annotating a prior communication, and wherein when the input datum is the annotating datum, the finite state machine operates to produce an output annotating datum that annotates the prior communication.

15. A non-transitory, tangible computer readable storage medium on which is stored computer program code for performing a computation upon a stream of data that is organized according a plurality of contexts, the program code comprising a plurality of transition tables for a respective plurality of programmable finite state machines that are arranged in a physical sequence, each transition table defining a plurality of states and being formed as a function of a position of its respective finite state machine in the sequence, wherein the computation is collectively performed by causing each finite state machine to sequentially apply its transition table according to a context in the plurality of contexts, to each given datum in the stream of data and an associated input metadata signal, producing a new state associated with the given datum, wherein a final finite state machine in the sequence indicates whether the computation is successful, wherein each given datum is associated with a context in the plurality of contexts, and wherein when a first input datum is associated with a first context but a next input datum is associated with a different, second context, the active state is stored into a memory in association with data identifying the first context and a new state of the programmable finite state machine is retrieved from the memory according to data identifying the second context.

16. The storage medium according to claim 15, further comprising program code for reprogramming at least one transition table during the course of the computation.

17. The storage medium according to claim 15, further comprising program code for causing at least one programmable finite state machine in the sequence to produce an output datum that is different than a given input datum, thereby modifying the stream of data received by a succeeding processing element in the sequence.

18. The storage medium according to claim 15, further comprising program code for introducing a latency into producing the new state of at least one finite state machine in the sequence.

19. The storage medium according to claim 15, further comprising program code for performing either or both of: (a) receiving, by a finite state machine in the sequence, a plurality of input data and associated input metadata signals from a plurality of preceding finite state machines, and (b) transmitting the new state to a plurality of succeeding finite state machines.

20. The storage medium according to claim 15, wherein each context is associated with a session comprising a plurality of data communications, the stream of data includes, for each such communication, the communicated data and a datum for annotating the communication, and wherein at least one transition table stored on the storage medium defines an annotating state wherein a finite state machine, applying the at least one transition table to the annotating datum according to the first context, annotates the communication by modifying the annotating datum in-place.

21. The storage medium according to claim 20, wherein the communicated data comprise the first input datum, the second input datum is between the first input datum and the annotating datum in the stream of data, and wherein the at least one transition table defines a transition function for the second input datum so that the finite state machine, when applying the at least one transition table to the second input datum, enters the annotating state.

* * * * *